US006556321B1

(12) United States Patent
Milton et al.

(10) Patent No.: US 6,556,321 B1
(45) Date of Patent: Apr. 29, 2003

(54) WDM OPTICAL NETWORK AND SWITCHING NODE WITH PILOT TONE COMMUNICATIONS

(75) Inventors: David Milton, Kanata; Tomas Valis, Ottawa; Gino Totti, Kanata; Kexing Liu; Michel Pigeon, both of Nepean, all of (CA)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/372,576

(22) Filed: Aug. 12, 1999

Related U.S. Application Data

(62) Division of application No. 08/917,784, filed on Aug. 27, 1997.

(51) Int. Cl.[7] ................................................ H04J 14/02
(52) U.S. Cl. ........................ 359/124; 359/110; 359/119
(58) Field of Search ................................. 359/119, 110, 359/128, 124; 370/222, 907

(56) References Cited

U.S. PATENT DOCUMENTS

| 3,501,640 | A | 3/1970 | Harris et al. ................. 359/122 |
| 3,864,533 | A | 2/1975 | Erlund ..................... 179/175.2 |
| 4,042,794 | A | 8/1977 | Lima et al. ............... 179/175.2 |
| 4,112,293 | A | 9/1978 | Käch .......................... 359/166 |
| 4,244,045 | A | 1/1981 | Nosu et al. ..................... 370/3 |
| 4,373,782 | A | 2/1983 | Thelen ....................... 359/124 |
| 4,380,061 | A | 4/1983 | Mori et al. .................... 370/16 |
| 4,441,181 | A | 4/1984 | Winzer et al. ............... 359/130 |
| 4,451,916 | A | 5/1984 | Casper et al. ................. 370/16 |
| 4,542,496 | A | 9/1985 | Takeyama et al. ............ 370/16 |

(List continued on next page.)

FOREIGN PATENT DOCUMENTS

| CA | 1248193 | 1/1989 | ............. H04L/5/14 |
| CA | 2108305 | 4/1994 | ......... H04B/010/14 |
| CA | 2181362 | 7/1995 | ........... H04B/10/20 |
| CA | 2218089 | 10/1996 | ........... H04B/10/20 |
| CA | 2188208 | 4/1997 | ......... H04L/12/437 |
| CA | 2196121 | 8/1997 | ......... H04L/12/437 |
| CA | 2264395 | 3/1998 | ........... H04L/12/56 |
| DE | 197 00 682 A | 1/1998 | ............ H04J/14/02 |
| EP | 0400 959 A | 12/1990 | ........... H04Q/11/04 |
| EP | 0620694 | 10/1994 | |

(List continued on next page.)

OTHER PUBLICATIONS

Karol, "Optical Interconnection Using Shuffle Net Multihop Networks in Multi-Connected Ring Topologies," AT&T Bell Laboratories, *ACM*, 1988, pp. 25–34.
Abeysundara et al. "High-Speed Local Area Networks and Their Performance: A Survey," *ACM Computing Surveys*, vol. 23, No. 2, Jun. 1991, pp. 221–264.

(List continued on next page.)

*Primary Examiner*—Kinfe-Michael Negash
(74) *Attorney, Agent, or Firm*—Hunton & Williams

(57) ABSTRACT

A communications network has a plurality of nodes interconnected by an optical transmission medium. The transmission medium is capable of a carrying a plurality of wavelengths organized into bands. A filter at each node for drops a band associated therewith and passively forwards other bands through the transmission medium. A device is provided at each node for adding a band to the transmission medium. Communication can be established directly between a pair of nodes in the network sharing a common band without the active intervention of any intervening node. This allows the network to be protocol independent. Also, the low losses incurred by the passive filters permit relatively long path lengths without optical amplification.

12 Claims, 12 Drawing Sheets

U.S. PATENT DOCUMENTS

| | | |
|---|---|---|
| 4,561,088 A | 12/1985 | Champlin et al. ............ 370/16 |
| 4,648,088 A | 3/1987 | Cagle et al. .................. 370/16 |
| 4,707,064 A | 11/1987 | Dobrowolski et al. ...... 359/127 |
| 4,763,317 A | 8/1988 | Lehman et al. ............... 370/58 |
| 4,815,803 A | 3/1989 | Faulkner et al. ......... 350/96.14 |
| 4,821,255 A | 4/1989 | Kobrinski ................... 359/128 |
| 4,835,763 A | 5/1989 | Lau ........................... 370/16 |
| 4,837,856 A | 6/1989 | Glista ........................ 455/601 |
| 4,880,289 A | 11/1989 | Imoto et al. .................. 350/96 |
| 4,901,306 A | 2/1990 | Gardner ...................... 359/125 |
| 4,927,225 A | 5/1990 | Levinson ................. 350/96.18 |
| 4,956,836 A | 9/1990 | Boatwright ................ 370/16.1 |
| 5,000,531 A | 3/1991 | Burrberry ................ 350/96.16 |
| 5,002,350 A | 3/1991 | Dragone .................... 359/124 |
| 5,119,223 A | 6/1992 | Panzer et al. ............... 359/123 |
| 5,144,465 A | 9/1992 | Smith ......................... 359/117 |
| 5,191,457 A | 3/1993 | Yamazaki ................... 359/124 |
| 5,191,626 A | 3/1993 | Stern .......................... 385/24 |
| 5,202,780 A | 4/1993 | Fussgänger ................ 359/125 |
| 5,216,666 A | 6/1993 | Stalick ...................... 370/16.1 |
| 5,221,983 A | 6/1993 | Wagner ...................... 359/125 |
| 5,255,332 A | 10/1993 | Welch et al. ................. 385/17 |
| 5,278,687 A | 1/1994 | Jannson et al. ............. 359/125 |
| 5,283,845 A | 2/1994 | Ip ............................... 385/24 |
| 5,289,302 A | 2/1994 | Eda ........................... 359/123 |
| 5,317,198 A | 5/1994 | Husbands ................... 307/116 |
| 5,319,435 A | 6/1994 | Melle et al. .................. 356/32 |
| 5,319,485 A | 6/1994 | Yasui et al. ................. 359/128 |
| 5,333,130 A | 7/1994 | Weissmann et al. .......... 370/16 |
| 5,357,359 A | 10/1994 | Uchiyama et al. .......... 359/123 |
| 5,365,344 A | 11/1994 | Eda et al. ................... 359/124 |
| 5,369,515 A | 11/1994 | Majima ...................... 359/125 |
| 5,369,516 A | 11/1994 | Uchida ....................... 359/125 |
| 5,384,651 A | 1/1995 | Van de Voorde et al. ... 359/152 |
| 5,400,163 A | 3/1995 | Mizuochi et al. ........... 359/124 |
| 5,406,401 A | 4/1995 | Kremer ...................... 359/110 |
| 5,414,540 A | 5/1995 | Patel et al. .................. 349/196 |
| 5,414,548 A | 5/1995 | Tachikawa et al. ......... 359/130 |
| 5,438,445 A | 8/1995 | Nakano ...................... 359/124 |
| 5,439,445 A | 8/1995 | Kontos .................... 604/103.1 |
| 5,440,416 A | 8/1995 | Cohen et al. ............... 359/127 |
| 5,442,623 A | 8/1995 | Wu ........................... 370/16.1 |
| 5,446,809 A | 8/1995 | Fritz et al. .................... 385/17 |
| 5,448,501 A | 9/1995 | Hablov et al. .............. 364/517 |
| 5,452,124 A | 9/1995 | Baker ......................... 359/341 |
| 5,455,698 A | 10/1995 | Udd ........................... 319/119 |
| 5,457,760 A | 10/1995 | Mizrahi ....................... 385/37 |
| 5,469,265 A | 11/1995 | Measures et al. ........... 356/419 |
| 5,475,780 A | 12/1995 | Mizrahi ....................... 385/37 |
| 5,479,082 A | 12/1995 | Calvani et al. ............. 359/127 |
| 5,488,500 A | 1/1996 | Glance ....................... 359/127 |
| 5,488,501 A * | 1/1996 | Barnsley ..................... 359/137 |
| 5,491,573 A | 2/1996 | Shipley ...................... 319/110 |
| 5,500,857 A | 3/1996 | Nakata ........................ 370/50 |
| 5,502,589 A | 3/1996 | Yamamoto et al. ......... 359/174 |
| 5,504,609 A | 4/1996 | Alexander et al. .......... 359/125 |
| 5,524,144 A | 6/1996 | Suzuki ....................... 319/176 |
| 5,548,431 A | 8/1996 | Shin et al. .................. 359/119 |
| 5,550,818 A | 8/1996 | Brackett et al. .............. 370/60 |
| 5,559,625 A | 9/1996 | Smith et al. ................ 359/125 |
| 5,566,014 A | 10/1996 | Glance ....................... 319/124 |
| 5,576,875 A | 11/1996 | Chawki et al. ............. 359/125 |
| 5,579,143 A | 11/1996 | Huber ........................ 359/130 |
| 5,583,683 A | 12/1996 | Scobey ...................... 359/127 |
| 5,600,466 A | 2/1997 | Tsushima et al. ........... 359/124 |
| 5,600,473 A | 2/1997 | Huber ........................ 359/179 |
| 5,608,825 A | 3/1997 | Ip ............................... 385/24 |
| 5,612,805 A | 3/1997 | Fevrier et al. .............. 359/124 |
| 5,612,824 A | 3/1997 | Si et al. ...................... 359/612 |
| 5,615,289 A | 3/1997 | Duck et al. ................... 385/24 |
| 5,615,290 A | 3/1997 | Harasawa et al. ............ 358/24 |
| 5,625,478 A | 4/1997 | Doerr et al. ................. 359/125 |
| 5,629,992 A | 5/1997 | Amersfoort et al. .......... 385/15 |
| 5,629,995 A | 5/1997 | Duck et al. ................... 385/24 |
| 5,631,758 A | 5/1997 | Knox et al. ................. 359/127 |
| 5,633,741 A | 5/1997 | Giles ......................... 359/124 |
| 5,638,473 A | 6/1997 | Byron ......................... 385/37 |
| 5,647,035 A | 7/1997 | Cadeddu et al. ............. 385/24 |
| 5,663,818 A | 9/1997 | Yamamoto et al. ......... 359/118 |
| 5,673,129 A | 9/1997 | Mizrahi ...................... 359/124 |
| 5,680,234 A | 10/1997 | Darcie et al. ............... 359/110 |
| 5,680,235 A | 10/1997 | Johansson ................... 359/110 |
| 5,680,490 A | 10/1997 | Cohen et al. ................. 385/24 |
| 5,692,076 A | 11/1997 | Delisle et al. ................ 385/15 |
| 5,712,717 A | 1/1998 | Hamel et al. ............... 359/130 |
| 5,715,076 A | 2/1998 | Alexander et al. .......... 359/130 |
| 5,717,795 A | 2/1998 | Sharma et al. ............... 385/24 |
| 5,717,796 A | 2/1998 | Glendening .................. 385/24 |
| 5,721,796 A | 2/1998 | de Barros et al. ............ 385/37 |
| 5,726,784 A | 3/1998 | Alexander et al. .......... 359/125 |
| 5,726,785 A | 3/1998 | Chawki et al. ............. 359/130 |
| 5,737,104 A | 4/1998 | Lee et al. ................... 359/124 |
| 5,742,416 A | 4/1998 | Mizrahi ...................... 359/134 |
| 5,742,585 A | 4/1998 | Yamamoto et al. ......... 370/223 |
| 5,748,349 A | 5/1998 | Mizrahi ...................... 359/130 |
| 5,748,350 A | 5/1998 | Pan et al. .................... 359/130 |
| 5,748,815 A | 5/1998 | Hamel et al. ................. 385/37 |
| 5,751,454 A | 5/1998 | MacDonald et al. ........ 359/119 |
| 5,751,456 A | 5/1998 | Koonen ..................... 359/127 |
| 5,754,321 A | 5/1998 | Giles et al. ................. 359/124 |
| 5,760,934 A | 6/1998 | Sutter et al. ................ 359/119 |
| 5,771,112 A | 6/1998 | Hamel et al. ............... 359/128 |
| 5,774,244 A | 6/1998 | Tandon et al. .............. 359/125 |
| 5,774,245 A | 6/1998 | Baker ......................... 359/128 |
| 5,774,606 A | 6/1998 | de Barros et al. ............ 385/24 |
| 5,778,118 A | 7/1998 | Sridhar ........................ 385/24 |
| 5,784,184 A | 7/1998 | Alexander et al. .......... 359/125 |
| 5,786,915 A | 7/1998 | Scobey ...................... 359/127 |
| 5,793,507 A | 8/1998 | Giles et al. ................. 359/125 |
| 5,793,508 A | 8/1998 | Meli ........................... 359/130 |
| 5,793,908 A | 8/1998 | Mizuochi et al. ............. 385/24 |
| 5,796,502 A | 8/1998 | Haller et al. ................ 359/124 |
| 5,808,763 A | 9/1998 | Duck et al. ................. 359/127 |
| 5,808,764 A | 9/1998 | Frigo et al. ................. 359/127 |
| 5,812,306 A | 9/1998 | Mizrahi ...................... 359/341 |
| 5,812,709 A | 9/1998 | Arai et al. .................... 385/16 |
| 5,812,711 A | 9/1998 | Glass et al. ................... 385/37 |
| 5,822,095 A | 10/1998 | Taga et al. .................. 359/127 |
| 5,822,474 A | 10/1998 | Hara ............................ 385/24 |
| 5,838,848 A | 11/1998 | Laude ........................ 385/24 |
| 5,850,301 A | 12/1998 | Mizuochi et al. ........... 359/124 |
| 5,852,505 A | 12/1998 | Li .............................. 359/118 |
| 5,864,414 A | 1/1999 | Barnsley et al. ............ 319/125 |
| 5,867,289 A | 2/1999 | Gerstel et al. .............. 359/110 |
| 5,870,212 A * | 2/1999 | Nathan et al. .............. 359/119 |
| 5,886,801 A | 3/1999 | Van Deventer ............. 359/119 |
| 5,889,600 A | 3/1999 | McGuire .................... 359/128 |
| 5,903,371 A | 5/1999 | Arecco et al. .............. 359/119 |
| 5,903,691 A | 5/1999 | Wisseman et al. ............ 385/37 |
| 5,905,827 A | 5/1999 | Naganuma et al. ........... 385/31 |
| 5,912,751 A | 6/1999 | Ford et al. .................. 359/128 |
| 5,915,051 A | 6/1999 | Damask et al. ............... 385/16 |
| 5,917,625 A | 6/1999 | Ogusu et al. ............... 359/130 |
| 5,920,411 A | 7/1999 | Duck et al. ................. 359/127 |
| 5,920,412 A | 7/1999 | Chang ........................ 359/128 |
| 5,930,016 A | 7/1999 | Brorson et al. ............. 359/127 |
| 5,938,309 A | 8/1999 | Taylor ........................ 359/176 |
| 5,940,208 A | 8/1999 | Blaszyk et al. ............. 359/341 |
| 5,943,150 A | 8/1999 | Deri et al. ................... 359/133 |
| 5,953,141 A | 9/1999 | Liu et al. .................... 359/124 |
| 5,959,749 A | 9/1999 | Danagher et al. ........... 359/124 |

| | | |
|---|---|---|
| 5,963,350 A | 10/1999 | Hill .............................. 359/127 |
| 5,963,685 A | 10/1999 | Nishino ........................ 385/24 |
| 5,978,114 A | 11/1999 | Clark et al. ................. 359/115 |
| 5,982,516 A | 11/1999 | Murphy et al. ............. 359/118 |
| 5,982,517 A * | 11/1999 | Fishman ..................... 359/119 |
| 5,982,518 A | 11/1999 | Mizrahi ...................... 359/130 |
| 5,986,783 A | 11/1999 | Sharma et al. .............. 359/119 |
| RE36,471 E | 12/1999 | Cohen ......................... 319/127 |
| 5,999,290 A | 12/1999 | Li ................................ 359/124 |
| 5,999,322 A | 12/1999 | Cushing ..................... 359/589 |
| 6,002,503 A | 12/1999 | Mizrahi ...................... 359/124 |
| 6,002,504 A | 12/1999 | Tillerot et al. .............. 359/172 |
| 6,038,045 A | 3/2000 | Sotom et al. ................ 359/128 |
| 6,041,152 A | 3/2000 | Clark ........................... 385/24 |
| 6,043,914 A | 3/2000 | Cook et al. ................. 359/124 |
| 6,055,112 A | 4/2000 | Campbell-Miller et al. . 359/652 |
| 6,061,484 A | 5/2000 | Jones et al. .................... 385/24 |
| 6,069,719 A | 5/2000 | Mizrahi ...................... 359/124 |
| 6,084,694 A | 7/2000 | Milton et al. ............... 359/124 |
| 6,091,529 A | 7/2000 | Fischer et al. .............. 359/172 |
| 6,118,563 A | 9/2000 | Boskovic et al. ........... 359/124 |
| 6,122,095 A | 9/2000 | Fatehi ......................... 359/337 |
| 6,122,096 A | 9/2000 | Fatehi ......................... 359/341 |
| 6,134,036 A | 10/2000 | Andreozzi et al. .......... 359/127 |
| 6,175,432 B1 | 1/2001 | Wu et al. ..................... 359/124 |
| 6,181,850 B1 | 1/2001 | Nakamura et al. ............ 385/33 |
| 6,208,441 B1 | 3/2001 | Jones et al. ................. 359/127 |
| 6,208,443 B1 | 3/2001 | Liu et al. ..................... 359/127 |
| 6,243,179 B1 | 6/2001 | Thompson et al. ......... 359/130 |
| 6,281,997 B1 | 8/2001 | Alexander et al. .......... 359/130 |
| 6,310,994 B1 | 10/2001 | Jones et al. .................... 385/24 |
| 6,333,798 B1 | 12/2001 | Allan et al. ................. 359/127 |
| 6,348,984 B1 * | 2/2002 | Mizrahi ...................... 359/124 |

FOREIGN PATENT DOCUMENTS

| | | | |
|---|---|---|---|
| EP | 0620694 A2 | 10/1994 | .......... H04Q/11/00 |
| EP | 0 651 529 A1 | 5/1995 | .......... H04J/14/02 |
| EP | 0677935 | 10/1995 | |
| EP | 0720411 A | 7/1996 | .......... H04Q/12/56 |
| EP | 0730172 | 9/1996 | |
| EP | 0 769 859 | 4/1997 | |
| GB | 1 447 007 | 8/1976 | |
| GB | 2 012 526 A | 7/1979 | |
| GB | 2 305 041 A | 7/1996 | .......... H04J/14/02 |
| JP | A-S56-114457 | 9/1981 | .......... H04B/9/00 |
| JP | 57-173245 | 10/1982 | |
| JP | A-S59-182638 | 10/1984 | .......... H04B/9/00 |
| JP | 0183927 | 7/1989 | |
| JP | 2-195305 | 5/1990 | |
| JP | 0065838 | 3/1991 | |
| JP | A-H4-117042 | 4/1992 | .......... H04L/11/00 |
| JP | 04167634 A | 6/1992 | .......... H04B/10/20 |
| JP | A-H5-14283 | 1/1993 | .......... H04L/11/00 |
| JP | 07250356 A | 9/1995 | .......... H04Q/3/52 |
| JP | 09051560 A | 2/1997 | |
| JP | 09083595 A | 3/1997 | |
| WO | WO 96/32787 | 10/1996 | |
| WO | WO97/22190 | 6/1997 | .......... H04J/14/02 |
| WO | WO99/07097 | 2/1999 | .......... H04J/14/02 |

OTHER PUBLICATIONS

Aggrawal et al., Chapter 46: "Efficient Routing and Scheduling Algorithms for Optical Networks," pp. 412–423.

Dowd, "High Performance Interprocessor Communication Through Optical Wavelength Division Multiple Access Channels," ACM, 1991, pp. 96–105.

Marsan et al., "Topologies for Wavelength–Routing All–Optical Networks," IEEE/ACM Transactions on Networking, vol. 1, No. 5, Oct. 1993, pp. 534–546.

Scott, et al., "Demonstrating Next–Generation Optical Transmission," Telesis, Bell–Northern Research Ltd., Dec. 1994 (7 pages).

Beaumont et al., "Next–Generation Network Architectures and Technology Platforms," Telesis, Bell–Northern Research Ltd., Oct. 1995 (11 pages).

Wirbel, "Sonet Transport Catches a Wave," Electronic Engineering Times, Sep. 16, 1996 (4 pages).

Snyder, "Branded with Optics," Telephony, Jul. 22, 1996 (3 pages).

Snyder, "Sprint Makes Strides in Sonet Service," Telephony, Jun. 17, 1996 (2 pages).

Tachikawa et al., "New Functional Multiaddress Channel Selective Terminal Using an Arrayed Waveguide Grating Multiplexor with Cross–Connect Loopback Paths," IEEE Proc. on Optoelectronics, Oct. 1995 (Abstract–1 page).

Raghavan et al., "Efficient Routing in All–Optical Networks," ACM, 1994, pp. 134–143.

Iness et al., "GEMNET: A Generalized, Shuffle–Exchange–Based, Regular, Scalable, Modular, Multihop, WDM Lightwave Netowrk," IEEE/ACM Transactions on Networking, vol. 3, No. 4, Aug. 1995, pp. 470–476.

Desai et al., "A Comparative Study of Single Hop WDM Interconnections for Multiprocessors," ACM, 1995, pp. 154–163.

Ramaswami et al., "Routing and Wavelength Assignment in All–Optical Networks," IEEE/ACM Transactions on Networking, vol. 3, No. 5, Oct. 1995, pp. 489–500.

TROY E. Adams et al., "Metropolitan Area Optical Networking", ONI0257171–ONI0257179.

OFC'94, Optical Fiber Communication, Feb. 20–25, 1994, vol. 4, 1994 Technical Digest Series, pp. 214–216.

Upgrade of Passive Optical Subscriber Network, Norio Kashima, Journal Lightwave Technology, vol. 9, No. 1, January 1991, pp. 113–120.

Optical Cross–Connect System in Broad–Band Networks: System Concept and Demonstrators Description, Sonny Johansson et al., Journal of Lightwave Technology, vol. 11, No. 5/6, 1993, pp. 668–694.

Optical Transparency, A New Paradigm for Telecommunications, Peter Cochrane et al., Optics & Photonics News, August 1994, pp. 15–19, 54.

An Optical Multiwaveguide interference filter, Mark Earnshaw et al., Optics Communications, 116, May 1, 1995, pp. 339–342.

The Design of in–fiber Bragg grating systems for cubic and quadratic dispersion compensation, J.A.R. Williams et al., Optics Communications, 116, Apr. 15, 1995, pp. 62–66.

Holographically generated gratings in optical fibers, W. W. Morey et al., Optics & Photonics News, July 1990, pp. 14–16.

High Performance Modular DWDM Implementation Based on Fibre Bragg Grating Mach Zehnder Interferometers, S.J. Madden et al., Sep. 14–17, 1998, vol. 1.

High accuracy dispersion measurements of chirped fibre gratings, S. Barcelos et al., Electronics Letter, Jul. 20, 1995, vol. 31, No. 15, pp. 1280–1282.

Multiwavelength Optical Networking: An Overview of the MONET Project, W. Tomlinson, Twelfth Annual National Fiber Optic Engineers Conference, Sep. 10, 1996, vol. 2, pp. 153–161.

Novel Techniques for Multichannel Wavelength Division Multiplying, A. C. Carter, OFC/IOOC, Feb. 26, 1986.

Evolutionary Wavelength Division Multiplexed Schemes for Broadband Networks, G. R. Hill, et al., OFC/IOOC, 1987.

Multiple–Channel Routing in a Linear Lightwave Networks, K. Bala, et al., OFC 91, Feb. 22, 1991, p. 218.

Direct Detection of Closely Space Optical FM Frequency Division Multiplexed Gigabit Per–Second Microwave PSK signals, W. I. Way et al., OFC 91, Feb. 21, 1991, p. 162.

Networking Testbeds at Gigabit/Second Speeds, R. Binder, OFC, 1992, p. 27.

Dense WDM, Photonics Spectra, Innovative Products, April 1999, p. 202.

Dense WDM Expander, Photonics Spectra, Innovative Products, December 1999, pp. 162–163.

Integrated Optics NxN Multiplexer on Silicon, C. Dragone et al., IEEE Photonics Technology Letters, October 1991, vol. 3, No. 10, pp. 896–899.

Multichannel Frequency–Selective Switch Employing an Arrayed–Waveguide Grating Multiplexer with Fold–Back Optical Paths, Osamu Ishida, IEEE Photonics Technology Letters, October 1994, vol. 6, No. 10, pp. 1219–1221.

Wavelength–Tunable Add/Drop Optical Filter, B. Glance, IEEE Photonics Technology Letters, February 1996, vol. 8, No. 2, pp. 245–247.

Advancement and Application of HDWDM Technology in China, Deming Wu, SPIE, vol. 2893, September 1996.

Clear Channel Strategies for a Scalable Wide–Area Networks, S. V. Jagannath, et al., SPIE, vol. 2614, December 1995, pp. 274–282.

Optimal Power Distribution in Robust, Passive, Fiber Optic Local Communication Networks with Circulant Topologies, Ondria J. Wasem, INFOCOM 1991, pp. 0032–0038.

Arrayed–Waveguide Grating Add–Drop Multiplexer with Loop–Back Optical Paths, Y. Tachikawa, et al., Electronics Letters, vol. 29, No. 24, Nov. 25, 1993, pp. 2133–2134.

Arrayed–Waveguide Grating Multiplexer with Loop–Back Optical Paths and Its Applications, Y. Tachikawa, et al., Journal of Lightwave Technology, vol. 14, No. 6, June 1996, pp. 977–984.

Design of WDMA/SFDMA Lightwave Networks, N.K. Shankaranarayanan et al., GLOBECOM 1991, pp. 1251–1257.

Multi–Gb/s Optical Cross–Connect Switch Architectures:TDM Versus FDM Techniques, Kai Y. Eng, GLOBECOM 1989, pp. 0999–1003.

Impact of New Lightwave Technologies on Terrestrial Long-haul Network Evolution, C. Fan, et al., Optics & Photonics News, February 1995, pp. 26–32.

10 GHz Spacing Optical Frequency Division Multiplexer Based on Arrayed–Waveguide Grating, H. Takahashi et al., Electronics Letters, vol. 28, No. 4, Feb. 13, 1992, pp. 380–382.

Arrayed Waveguide Grating for Wavelength Division Multi/Demultiplexer with Nanometre Resolution, H. Takahashi, et al., Electronics Letters, vol. 26, No. 2, Jan. 18, 1990, pp. 87–88.

Photonic Transport Networks, G. Hill, ECOC 1995–Brussels, vol. 4, Tutorial 1, Sep. 18, 1995, pp. 1–24.

Eight–Channel Wavelength Division Switching Experiment Using Wide–Tuning Range DFB LD Filters, M. Nishio, et al., ECOC 1988, Part 2, September 1988, pp. 49–51.

Tunable WDM–Channel Group Drop Filters Based on a Smart Device Configuration, Y. Tachikawa, et al., Electronics Letters, vol. 31, No. 23, Nov. 9, 1995, pp. 2029–2030.

Passive WDM Add/Drop, Proceedings of AT&T Bell Laboratories Advanced Information Technology Seminar, Shanghai, Beijing, Jul. 11–16, 1994.

Radiation and Fiber Bragg Gratings, A. Guasarov et al., SCK, CEN, Belgium, pp. 1–51.

Stable Single Mode Hybrid Laser with High Power and Narrow Linewidth, P.A. Morton, et al., Applied Physics Letters, vol. 64, No. 20, May 16, 1994, pp. 2634–2636.

Frequency Stablized 622–Mb/s 16–Channel Optical FDM System and Its Performance in 1.3–1.55–um Zero–Dispersion Fiber Transmission, T. Mizuochi et al., Journal of Lightwave Technology, vol. 13, No. 10, October 1995, pp. 1937–1947.

Fiber Gratings and Related Technologies 2, T. Erdogan et al., CLEO, 1994, pp. 260–261.

Distributed and Multiplexed Fiber Optic Sensors, A. Kersey et al., SPIE Proceedings, vol. 1586, Sep. 4–5, 1991, pp. 216–224.

Filter Codec and Line Card Chips: The New Generation, T. Caves et al., BNR Telesis Four, vol. 10, No. 4, 1983, pp. 2–7.

Processing Integrated Circuits with a Laser, I. Calder et al., BNR Telesis Four, vol. 10, No. 4, 1983, pp. 8–13.

Putting Ions to Works for Faster Denser, Cheaper Chips, S. Dzioba et al., BNR Telesis Four, vol. 10, No. 4, 1983, pp. 14–19.

Automated Testing of Fiber Optics Transmission Equipment, G. Goddard et al., BNR Telesis Four, vol. 10, No. 4, 1983, pp. 20–24.

Transmission Standard Make Networks Cost–Effective, N. Psimenatos et al., BNR Telesis Four, vol. 10, No. 4, 1983, pp. 25–31.

Wavelength dilated switches–a new class of suppressed crosstalk, dynamic wavelength–routing crossconnects, Jacob Sharony et al., OFC'92/Tuesday Afternoon, pp. 88–89.

Multiwavelength Reconfigurable All–Optical Network Testbed, G.K. Chang et al., National Fiber Optic Engineers Conference, Boston, MA, Jun. 18–22, 1995, pp. 1200–1206.

Four Channel Fiber Grating deMultiplexer, V. Mizrahi et al., Electronics Letters, vol. 30, No. 10, May 12, 1994, pp. 780–781.

Error–rate degradation due to fiber four–wave mixing in a 622–Mbs 16–channel FDM heterodyne system, Mizuochi et al., OFC '94 Technical Digest, Feb. 1994.

Fiber–grating transmission filters for use in an all–fiber demultiplexer, Mizrahi et al., OFC '94 Technical Digest, Feb. 1994.

Interferometric crosstalk–free optical add/drop multiplexer using cascaded Mach–Zehnder fiber gratings, Mizuochi, et al., OFC '97 Technical Digest, Feb. 1997.

Fiber phase gratings reflect advances in lightwave technology, T. Erdogen et al., Laser Focus World, Feb. 1994.

Optical amplifiers for video distribution, D.R. Huber et al., International Journal of Digital and Analog Communications Systems, vol. 3, Dec. 1990.

Nortel's great light hope, James Bagnall, Dec. 20, 2001.

Performance degradation of multiwavelength optical networks due to laser and (de)multiplexer misalignments, N.N. Khrais et al., IEEE Photonics Technology Letters, vol. 7, Nov. 1995.

On wavelength translation in all–optical networks, Milan Kovacevic et al., IEEE Infocom '95.

Performance implications of component crosstalk in transparent lightwave networks, E.L. Goldstein et al., IEEE Photonics Technology Letters, vol. 6, May 1994.
Personal communications access networks using subcarrier multiplexed optical lengths, Ozan Tonguz et al., Journal of Lightwave Technology, Jun. 1996.
A 32–channel tunable receiver module for wavelength–division multiple–access networks, F. Tong et al., IEEE Photonics Technology Letters, Nov. 1997.
Performance of cascaded misaligned optical (de) multiplexers in multiwavelength optical networks, Khrais et al., IEEE Photonics Technology Letters, Aug. 1996.
Soliton WDM transmission of 8×2.5 Gb/s, error free over 10 Mm, Nyman et al., OFC '95 Technical Digest, 1995.
Design and performance of WDM transmission systems at 6.3 Mbit/s, Kanada et al., IEEE Transactions on Communications, Sep. 1983.
Loop distribution using coherent detection, Albanese et al., IEEE Journal on Selected Areas in Communications, Jul. 1988.
System design for optical PPM communications with diode combining, Gagliardi et al., IEEE Transactions on Communications, Feb. 1988.
Self–healing WDM ring networks with all–optical protection path, A. F. Elrefaie, OFC '92, Feb. 1992.
An optical FDM–based self–healing ring network employing arrayed wave guide grating filters and EDFA's with level equalizers, Toba et al., IEEE Journal on Selected Areas in Communications, Jun. 1996.
Wavelength reuse scheme in a WDM unit directional ring network using a proper fibre grating add/drop multiplexer, M. J. Chawki et al., Electronics Letters, Mar. 1995.
Towards all–optical networking, A. Fioretti et al. (undated).
Waveband and channel routing in a linear lightwave network, K. Bala et al. (undated).
Optical wavelength add–drop multiplexer in installed submarine WDM network, Jones et al., Electronics Letters, Nov. 1995.
Evaluation of an optical boosted add/drop multiplexer OBADM including circulators and fiber grating filters, Chawki et al., ECOC '95–Brussels.
Proceedings of AT&T Bell Laboratories Advanced Information Technology Seminar, Jul. 11–16, 1994.
Optical networks: a practical perspective, Rajiv Ramaswami et al., Feb. 1998.
Tunable acousto–optic waveguide filters, OFC/IOOC '93 Technical Digest, Feb. 1993.
Sonet ring applications for survivable fiber loop networks, J. Sosnosky et al., IEEE Communications Magazine, Jun. 1991.
Optical communications systems, John Gowar, $2^{nd}$ edition, 1993 (chapters 1,5,11,13,16,17,18–21,24, and 26).
Fiber–based passive components, Kenneth O. Hill, Feb. 4, 1992.
In–fiber Bragg grating devices for telecommunications applications, David Huber (undated).
A fully transparent fiber–optic ring architecture for WDM networks, Irshid et al., Journal of Lightwave Technology, Jan. 1992.
Hierarchical optical path cross–connect systems for large scale WDM networks, Harada et al. (undated).
Wavelength conversion in WDM networking, B. Ramamurthy et al.

Wavelength converter technology, Stubkjaer et al., IEICE Trans. Commun., Feb. 1999.
DWDM: feedingourinsatiableappetiteforbandwidth, Nicolas Cravotta, EDN Magazine, Sep. 1, 2000.
A wavelength encoded multichannel optical bus for local area networks, Chen et al., Journal of Lightwave Technology, Mar. 1996.
Performance impact of partial reconfiguration on multihop lightwave networks, Jean–Francois Labourdette, IEEE/ACM Transactions on Networking, Jun. 1997.
Performance impact of partial reconfigurability in lightwave networks, Jean–Francois Labourdette, 1995.
Multi–fiber linear lightwave networks, Wong et al., 1993.
Rooted routing in linear lightwave networks, M. Kovacevic et al., INFOCOM '92.
A linear lightwave BENES network, Pieris et al., IEEE/ACM Transactions on Networking, Aug. 1993.
10–channel ×10 Gbit/s WDM add/drop multiplexing/transmission experiment over 240 km of dispersion–shifted fibre employing unequally–spaced arrayed–waveguide–grating ADM filter with full–back configuration, Fukui et al., Electronics Letters, 1995.
An optical FDM–add/drop multiplexing ring network utilizing fiber Fabry–Perot filters and optical circulators, Oda et al., IEEE Photonics Technology Letters, Jul. 1993.
8×2.5 Gbit/s WDM transmission over 6000 km with wavelength add/drop multiplexing, Gautheron et al., Electronics Letters, May 1996.
A self–routing WDM high–capacity SONET ring network, W.I. Way et al., IEEE Photonics Technology Letters, Apr. 1992.
A transparent all–optical metropolitan network experiment in a field environment: the "PROMETEO" self–healing ring, Arecco et al., Journal of Lightwave Technology, Dec. 1997.
Analysis of crosstalk in WDM ring networks, Al–Orainy, IEEE Photonics Technology Letters, Dec. 1993.
Cascaded coupler Mach–Zehnder channel dropping filters for wavelength–division–multiplexed optical systems, M. Kuznetsov, Journal of Lightwave Technology, Feb. 1994.
Joined TDM and WDM for a multigigabit/s long haul transmission system, A. Hamel et al., EFOC/LAN 86, Jun. 1986.
Fiber amplifiers in closed–ring WDM networks, A. F. Elrefaie et al., Electronics Letters, Dec. 1992.
Multiplexing fiber Bragg grating sensors, W. W. Morey et al., Proceedings SPIE, Sep. 1991.
R&D progress report, Mizuochi et al. (undated).
8–channel 2.5 Gbit/s WDM transmission over 275 km using directly modulated 1.55 :m MQW DFB–LDs, Motoshima et al., OFC '95 Technical Digest.
Optical–fiber communication systems applied to local–area networks, Katsuyoshi Ito et al., Jun. 1986.
Fiber phase gratings reflect advances in lightwave technology, Turan Erdogen et al., Laser Focus World, Feb. 1994.
State of the art of optical fibers, fiber cables and their technologies, Hiroshi Murata, International Journal of High Speed Electronics, 1990.
High–speed Optoelectronic sources for multi–gigabit communication links, P.A. Morton et al., LEOS '94, 1994.
10 Gbit/s–270 km non–repeated optical transmission experiment with high receiver sensitivity, J. Nakagawa et al., Proceedings ECOC '95, Sep. 1995.
UV–written fiber gratings for optical communication systems, Victor Mizrahi et al. (undated).

High–power, narrow–line width, stable single–mode hybrid laser, P.A. Morton et al., OFC '94, Feb. 1994.

EDFA with multidynamic gain compensation for multi-wavelength transmission systems, K. Motoshima et al., OFC '94 Technical Digest, Feb. 1994.

Broadband and WDM dispersion compensation using chirped sampled fibre Brag gratings, F. Ouellette et al., Electronics Letters, May 1995.

Very broad reflection bandwidth (44 nm) chirped fiber gratings in narrow band pass filters produced by the use of an amplitude mask, M.C. Farries et al., Electronics Letters, May 1994.

Tunable erbium–ytterbium fiber sliding–frequency soliton laser, M. Romagnoli et al., J. Opt. Soc. Am., Jan. 1995.

Photoinduced Bragg gratings in optical fibers, William W. Morey et al., Optics and Photonics News, Feb. 1994.

622 Mbit/s–16–channel FDM coherent optical transmission system using two–section MQW DFB–LDs, Mizuochi et al., Electronics and Communications in Japan, 1995.

10 Gbit/s, 285 km repeaterless optical transmission experiments with highly sensitive optical preamplifier, Nakagawa et al., Electronics Letters, Jan. 1996.

Interferometric crosstalk–free optical add/drop multiplexer using Mach–Zehnder–based fiber gratings, Mizuochi et al., Journal of Lightwave Technology, Feb. 1998.

Optical properties of photosensitive fiber phase gratings, Victor Mizrahi et al., Journal of Lightwave Technology, Oct. 1993.

Stable single–mode Erbium fiber–grating laser for digital communication, Victor Mizrahi et al., Journal of Lightwave Technology, Dec. 1993.

Magnetic circular vs. linear dichroism effects: a case study at the $FeM_{2,3}$ edge (abstract), Journal of Applied Physics, Apr. 1997.

Video multicast using a VSB–AM external modulator at 1.5 :m, Y.S. Trisno et al., IEEE Photonics Technology Letters, Jul. 1991.

Automatic gain control of Erbium–dumped fiber amplifiers for WDM transmission systems, Motoshima et al., IEICE Trans. Commun. Sep. 1997.

Optically multiplexed Interferometric fiber optic sensor system, K.L. Belsley et al., Proceedings of SPIE, Fiber Optic and Laser Sensors III, Aug. 1985.

Wide–band frequency–modulation using optical techniques, D.R. Huber et al., Applied Optics, Apr. 1979.

Evolution of the neoclassical theory, L.M. Kovrizhnykh, Physica Scripta, Feb. 1991.

Band operation of guided–wave light modulators with filter–type coplanar electrodes, IEICE Trans. Electron, Jan. 1995.

Passive DWDM components using MicroPlasma optical interference filters, OFC '96 Technical Digest.

Demonstration of a gigabit WDMA networks using parallelly process subcarrier hopping pilot–tone ($P^3$) signaling technique, B.H. Wang et al., IEEE Photonics Technology Letters, Jul. 1996.

Transport network involving a reconfigurable WDM network layer–a European demonstration, Sonny Johansson, Journal of Lightwave Technology, Jun. 1996.

A field trial of fiberoptic subscriber loop systems utilizing wavelength–division multiplexers, Koichi Asatani et al., IEEE Transactions Communications, Sep. 1982.

Optoelectronic components make DMW networks practical, J.J. Pan et al., Laser Focus World, Jan. 1994.

Mechanical tunable fiber grating, O/E Land Inc., Nov. 1, 2001.

Fibre brag grating for telecommunications applications: tunable thermally stress enhanced ADM, Andre et al., Journal of Microwaves and Optoelectronics, Jul. 2001.

Optical networking, Daniel Al–Salameh et al., Bell Labs Technical Journal, Jan.–Mar. 1998.

Frequency stabilization of optical FDM signals by using a fiber–brag–grating Fabry–Perot interferometer, T. Mizuochi et al., OFC–95 Technical Digest, 1993.

Components and devices for optical communications based on UV–written–fiber phase gratings, Victor Mizrahi, OFC/IOOC '93 Technical Digest.

10 Gbit/s repeaterless transmission over 258 km employing 24 ps RZ pulses, Shimizu et al., OFC '96 Technical Digest.

Ultraviolet–induced fiber phase gratings for optical communications systems, T. Erdogan et al., CLEO '94.

40–channel VSB–AM CATV link utilizing a high–power erbium amplifier, D.R. Huber, OFC '91, Feb. 1991.

Clear channel transmission of ATM/SONET and subcarrier multiplexed signals in a reconfigurable multiwavelength all–optical network testbed, G.K. Chang, IEEE Photonic Technology Letters, Oct. 1996.

Video Signal and Digital Signal Optical Wavelength Multiplex Transmission System, Toshio Takei et al., Mitsubishi Electronics Technical Report, vol. 55, No. 3, 1981 (Japanese language).

Subcarrier multiplexing (Japanese language).

A prototype circuit–switch multi–wavelength optical metro–area network, Frank J. Janniello et al., IEEE Journal of Lightwave Technology, vol. 11, May–Jun. 1993.

The use of fibre optics in cable communications networks, James A. Chiddix et al., IEEE Journal of Lightwave Technology, vol. 11, Jan. 1993.

All–fibre video distribution (AFVD) systems using SCM and EDFA techniques, Etsugo Yoneda et al., IEEE Journal of Lightwave Technology, vol. 11, Jan. 19, 1993.

Optical coherent broad–band transmission for long–haul and distribution systems using subcarrier multiplexing, Shigeki Watanabe et al., IEEE Journal of Lightwave Technology, vol. 11, Jan. 1993.

Subcarrier multiplexed broad–band service network: a flexible platform for broad–band subscriber services, Robert Olshansky et al., IEEE, Journal of Lightwave Technology, vol. 11, Jan. 1993.

WDM systems with unequally spaced channels, Fabrizio Forghieri et al., IEEE, Journal of Lightwave Technology, vol. 13, May 1995.

The design of a European Optical Network, M.J. O'Mahoney et al., IEEE, Journal of Lightwave Technology, vol. 13, May 1995.

A broad–band optical network based on hierarchical multiplexing of wavelengths and RF subcarriers, Soung C. Liew, et al., IEEE Journal of Lightwave Technology, vol. 7, Nov. 1989.

Technology and system issues for a WDM–based fibre loop architecture, Stuart S. Wagner et al., IEEE Journal of Lightwave Technology, vol. 7, Nov. 1989.

Optical Networks for local loop applications, David W. Faulkner et al., IEEE Journal of Lightwave Technology, vol. 7, Nov. 1989.

Switching Technologies for future guided wave optical networks: potentials and limitations of photonics and electronics, Lars Thylen et al., IEEE Communications Magazine, Feb. 1996.

WDMA/subcarrier–FDMA Lightwave Networks: limitations due to optical beat interference, N.K. Shankaranarayanan et al., IEEE, Journal of Lightwave Technology, vol. 9, Jul. 1991.

Architectures of Dynamically reconfigurable wavelength routing–switching networks, Jacob Sharony, Columbia University, 1993.

Future Optical Fibre Transmission Technology & Networks, Peter Cochrane, IEEE, Communications Magazine, Nov. 1988.

Seminar in information and communication theories, Spring 1996.

ONS 15454 Optical Transport System Revised Jul. 17, 2001.

Demonstrating Next Generation Optical Transmission, Mike Scott et al., Telesis No. 99.

Highways of Light towards an all–optical network, John McFarlane et al., Telesis No. 101.

Designing of Edge Interference Filters for wavelength–division multiplex transmission over multi–mode optical fibres, H.F. ahlein, Springer–Verlag 1980.

An architecture for optical ring trunk–transmission networks, Masahito Tomizawa et al., IEICE Trans. Commun., vol. E79–B, No. 8, Aug. 1996.

An optical fibre dropping method for residential premises employing optical drop wire standard cable, Kazuo Hogari et al., IEICE Trans. Commun., vol. E79–B, No. 2, Feb. 1996.

Multiwave networks and new approaches to packet switching, Matthew S. Goodman, IEEE Communications Magazine, Oct. 1989.

Multiwavelength reconfigurable all–optical network test pad, G.K. Chang et al., Jun. 18–22, 1995.

A scalable and switchless optical network structure, employing a single 32 free space creating multiplexer, A.M. Hill et al., IEEE, Photonics Technology letters, vol. 8, No. 4, Apr. 1996.

Multiwavelength performance of an apodized acoustic–optic switch, J.E. Baran, et al., OFC'94 Technical Digest, 1994.

Simultaneous and independent switching of 8–wavelength channels with 2–nm spacing using a wavelength dilated acoustic optic switch, Janet L. Jackel et al., IEEE, Photonics Technology Letters, vol. 8, Nov. 1996.

Beth Snyder, Sprint makes strides in Sonet service, ISSN:0040–2656, Jun. 17, 1996.

Beth Snyder, Branded with optics, ISSN:0040–2656, Jul. 19, 1996.

Kai Y. Eng., A multi–fiber ring architecture for Distributed lightwave networks, IEEE, 1988.

Yitzhak Birk, Fiber–Optic Bus–Oriented Single–Hop Interconnections among Multi–Transceiver Station, Journal of Lightwave Technology, vol. 9, No. 12, Dec. 1991.

"Logically Rearrangeable Multihop Lightwave Networks" by Labourdette, IEEE Transactions on Communications, vol. 39, No. 8, Aug. 1991.

"Design of Logical Topologies for Wavelength–Routed Optical Networks" by Ramaswami, IEEE Journal on Selected Areas in Communications, vol. 14, No. 5, Jun. 1996.

"Performance Analysis of Multihop Lightwave Networks with Hot Potato Routing and Distance–Age–Priorities" by Zhang, et al., IEEE, vol. Conf. 10,1991, pp. 1012–1021.

"Self–healing WDM Ring Networks with All–Optical Protection Path" by Elrefaie, OFC Conference, vol. 5, Feb. 1992, pp. 255–256.

"Multiwavelength Survivable Ring Network Architectures" by Elrefaie, ICC Conference, IEEE, 1993, pp. 1245–1251.

Textbook *Fiber Network Service Survivability* by Wu, Artech House, Norwood, MA, 1992, pp. 189–209.

"Wavelength–addressed Optical Network Using an ATM Cell–Based Access Scheme" by Shimosaka, et al, Technical Digest, Conference on Optical Fiber Communication/International Conference on Integrated Optics and Optical Fiber.

"Dense Wavelength Division Multiplexing Networks: Principles and Applications" by Brackett, IEEE Journal of Selected Areas in Communications, vol. 8, No. 6, Aug. 1990, pp. 948–964.

"Terabit Lightwave Networks: The Multihop Approach" by Acampora et al., AT & T Technical I Journal, vol. 66, Issue 6, Nov./Dec. 1987, pp. 21–34.

"The Lambdanet Mu ltiwavelength Network: Architecture, Applications, and Demonstrations" by Goodman, et al., IEEE Journal on Selected Areas in Communications, vol. 8, No. 6, Aug. 1990, pp. 995–1104.

"Fiber–optic Loop Bypass Via Dual Source Coupling" by Balliet, et al., mM Technical Disclosure Bulletin, vol. 26, No. 10B, Mar. 1984, pp. 5369–5370.

"On Survivable Rings" by Beardsley, et al., FOC/LAN 83, 7th International Fiber Optic Communications and Local Area Networks Expo, Oct. 1983, pp. 117–122.

"A Fiber–Optic Broadband LAN/OCS Using a PBX" by E. Hara, IEEE Communication Magazine, vol. 21, No. 7, Oct. 1983, pp. 22–27.

"Network Survivability Analysis" by R. Talbott, FOC/LAN '87 and MFOC–West: 11th Annual International Fiber Optic Communications and Local Area Networks Expo, Oct. 1987, pp. 259–274.

"A Shunted Ring Fiber Optic Network Topology Providing Fault Detection, Isolation and Circumvention" by Glista, IEEE 1993 National Aerospace and Electronics Conference, NAECON, May 1993, vol. 1, pp. 144–151.

"Optical Cross–Connect Architecture Using Free–Space Optical Switches Based On PI–Loss Topology" by Kuroyanagi, et al., GLOBECOM '95: Communications for Global Harmony, Nov. 1995, vol. 3, pp. 2112–2117.

"Fiber Optic Local–Area Networks" by Stanley, Proceedings of the National Electronics Conference, Sep./Oct. 1986, vol. 40, No. 1, pp. 482–490.

"Reduction of Restoration Capacity Requirements In Advanced Optical Networks" by Ayanoglu GLOBECOM '95 Communications for Global Harmony, Nov. 1995, vol. 2, pp. 1018–1022.

"A Novel Passive Protected SONET Bi–Directional Self–Healing Ring Architecture" by Wu, et al., Military Communications in a Changing World MILCOM, Nov. 1991, vol. 3, pp. 894–900.

"Yes, But How Do You Use It?" by King, Telephone Engineer and Management, Apr. 15, 1990, vol. 94, No. 8, pp. 114, 117–118, 120.

"Photonic Switching in Ring–Based Optic Networks" by Khurshid, et al., INFOCOM '89, Conference on Computer Communications, Apr. 1989, vol. 3, pp. 867–876.

"The Uses of Optical Switches in Fibre Optic Local Area Networks" by Hunter, et al., IEE Colloquium on 'Fibre Optic LANS and Techniques for the Local Loop', Mar. 1989, pp. 7/1–4.

"16ch Optical Add/Drop Multiplexer Using Silica–Based Arrayed–Waveguide Gratings" by Okamoto, et al., OFC '95: Optical Fiber Communication, Feb./Mar. 1995, vol. 8, pp. 363–366.

"Multilayer Add–Drop Multiplexers in A Self–Healing WDM Ring Network" by Hamel, et al., OFC '95: Optical Fiber–Communication, vol. 8, Feb./Mar. 1995, pp. 84–85.

"Optical Filters in WDM Ring Network Architectures" by Hamel, et al., Proceedings of the SPIE, 1995, vol. 2449, pp. 70–77.

"Subcarrier Multiplexing Based Signaling and Access Control in Optical FDM Networks" by Sato, et al., IEEE Journal on Selected Areas in Communications, vol. 12, No. 1, pp. 159–170.

"Laboratory Demonstration of a 2.5–Gbit/s SDH–Compatible Optical Cross–Connect Network" by Depovere, et al., ECOC '94:20th European Conference on Optical Communication, Sep. 1994, vol. 2, pp. 571–574.

"Multiwavelength Line–Rate–Independent Optical Digital Cross–Connects Based on Low–Gain Fiber Amplifiers" by Chen, et al., IEEE Photonics Technology Letters, Sep. 1994, vol. 6, No. 9, pp. 1122–1125.

"Photonic Transport Networks Based on Optical Paths" by Sato, et al., International Journal of Communication Systems, Wiley, vol. 8, No. 6, pp. 377–389.

"New Optical Path Cross–Connect Architecture Offering High Modularity" by Watanabe, et al., 2nd Asia–Pacific Conference on Communications, APCC '95, Jun. 1995, vol. 1, pp. 89–92.

"Multiwavelength Self–Healing Ring Transparent Networks" by Wuttisittikulkij, et al., Globecom '95: Communications for Global Harmony, Nov. 1995, vol. 1, pp. 45–49.

"An Engineering Perspective on the Applications of Photonic Switching Technology" by Personick, Globecom '84: Communication in the Information Age, Nov. 1984, pp. 871–873.

"Optical Path Cross–Connect Node Architecture With High Modularity for Photonic Transport Networks" by Watanabe, et al., IEICE Transactions on Communication, Oct. 1994, vol. E77–B, Part 10, pp. 1220–1229.

"Cross Talks in Multiwavelength Optical Cross–Connect Networks" by Zhou, et al., OFC '95 Optical Fiber Communication, Feb./Mar. 1995, vol. 8, pp. 278–280.

"Optical Cross–Connect Based on WDM and Space–Division Multiplexing" by Jin, et al., IEEE Photonics Technology Letters, vol. 7, No. 11, pp. 1300–1302.

"Optical Crossconnect/ADM Based Networks" by Fujiwara, LEOS '94: 7th Annual Meeting of the IEEE Lasers and Electro–Optics Society, Oct./Nov. 1994, vol. 2, pp. 111–112.

"Optical Paths and Realization Technologies" by Sato, et al., 1994 IEEE Globecom: Communications: The Global Bridge, Nov./Dec. 1994, vol. 3, pp. 1513–1520.

"Optical Path Cross–Connect Systems Transport Experiment with Simulated Five–Node Network" by Koga, et al., Electronics Letters, vol. 31, No. 17, pp. 1470–1472.

"Reliability Model of the Optical Cross–Connect" by Sever.Informacija Telekomunikacije Automati, 1995. vol. 14. Part 1–3, pp. 39–47.

"A New Optical Path Cross–Connect System Architecture Utilizing Delivery and Coupling Matrix Switch" by Okamoto, et al., IEICE Transactions on Communications, Oct. 1994, vol. E77–B, No. 10, pp. 1272–1274.

"Functional Architecture for Optical Networks" by McGuire, et al., BT Technology Journal. Apr. 1995, vol. 13, No. 2, pp. 145–155.

"Optical Path Cross–Connect Node Architecture Offering High Modularity for Virtual Wavelength Paths" by Watanabe, et al., IEICE Transactions on Communications, vol. E78–B. Part 5. pp. 686–693.

"Optical Path Cross–Connect Systems for Photonic Transport Networks," by Okamoto,et al., Globecom .93, IEEE Global Telecommunications Conference, Nov./Dec. 1993, vol. 1. pp. 474–480.

"Reconfigurable Segmentation and Subnetworking for All–Optical Transmission Using an Optical Cross–Connect" by Rice. et al., Proceedings of the SPIE, 1995, vol. 2164, pp. 183.191.

"Technologies and. Architectures for Multiwavelength Optical Cross–Connects", by Tomlinson, et al., LEOS .95: IEEE Lasers and Elector–Optics Society 8th Annual Meeting, Oct. 1995, vol. 1, pp. 53–54.

"MONET: Multiwavelength Optical Networking" by Wagner. et al.. Journal of Lightwave Technology. vol. 14, No. 6. Jun. 1996, pp. 1349–1355.

"Optical Services in Future Broadband Networks" by Finn, IEEE Network, vol. 10, No. 6. Nov./Dec. 1996. pp. 7–13.

"Multiwavelength Optical Networks with Limited Wavelength Conversion", by Ramaswami, et al., IEEE INFOCOM 1997, vol. 2, pp. 489–498.

"A Wideband All–Optical WDM Network" by Kaminow. et al.. IEEE Journal of Selected Areas in Communications. vol. 14. No. 5. Jun. 1996. pp. 780–797.

"On the Future of Wavelength Routing Networks" by Gerstel et al.. mEE Network. vol. 10, No. 6. Nov./Dec. 1996. pp. 14–20.

"On the Number of Wavelengths and Switches in All–Optical Networks" by Barry, et al., IEEE Transactions on Communications, vol. 42, No. 2–4. Feb./Mar./Apr. 1994. pp. 583–591.

"Some Principles for Designing a Wide–Area WDM Optical Network" by Mukherjee. et al.. IEEE/ACM Transactions on Networking. vol. 4, No. 5. Oct. 1996. pp. 684–696.

"Routing and Wavelength Assignment in AII–Optical Networks" by Ramaswami. et al.. IEEE/ACM Transactions on Networking. vol. 3, No. 5, Oct. 1995. pp. 489–500.

"Optical Path Accommodation Designs Applicable to Large Scale Networks" by Nagatsu. et al. IEEE Transactions on Communications, vol. E78–B, No. 4, Apr. 1995, pp. 597–607.

"Optical Wavelength Routing, Translation, and Packet/Cell Switched Networks" by Bala, et al., Journal of Lightwave Technology, vol. 14, No. 3, Mar. 1996, pp. 336–343.

"Multi–Wavelength Transport Networks" by Chidgey, IEEE Comminications Magazine, Dec. 1994, vol. 32, No. 12, pp. 28–35.

"A New Model for Optimal Routing and Wavelength Assignment in Wavelength Division Multiplexed Optical Networks" by Chen, et al., UEEE INFOCOM 1996, vol. I, Mar. 1996, pp. 164–171.

"A Scalable Multiwavelength Multihop Optical Networks: A Proposal for Research on All–Optical Network" by gt, et al., Journal of Lightwave Technology, vol. 11, No. 5/6, May–Jun. 1993, pp. 736–753.

"A Transport Network Layer Based on Optical Network Elements" by Hill, et al., Journal of Lightwave Technology, vol. 11, No. 5/6, May–Jun. 1993, pp. 667–679.

"A Precompetitive Consortium on Wide–Band All–Optical Networks" by Alexander, et al., Journal of Lightwave Technology, vol. 11, No. 516, May–Jun. 1993, pp. 714–735.

"Optical Versus Electronic Switching for Broadband Networks" by Hui, et al., IEEE Network, vol. 10, No. 6, Nov.–Dec. 1996, pp. 21–25.

"On the Limits of Electronic ATM Switching" by Butner, et al., IEEE Network, vol. 10, No. 6, Nov.–Dec. 1996, pp. 26–31.

"Local Access Optical Networks" by Frigo, et al., IEEE Network, vol. 10, No. 6, Nov.–Dec. 1996, pp. 32–36.

"Benefits of All–Optical Routing in Transport Networks" by Roorda, et al., OFC '95 Technical Digest, vol. 8, Feb.–Mar. 1995, pp. 164–165.

"Connectivity and Sparse Wavelength Conversion in Wavelength–Routing Networks" by Subramaniam, et al., 15th Annual Joint Conference of the IEEE Computer and Communications Soc., INFOCOM '96, Mar. 1996, vol. 1, No. 1, pp. 148–155.

"Efficient Routing in All–Optical Networks" by Raghavan, et al., 26th Annual ACM Symposium on the Theory of Computing; May 1994, pp. 134–143.

"Wavelength Assignments in Fixed Routing WDM Networks" by Subramaniam, et al., IEEE International Conference on Communications, vol. 1, Jun. 1997, pp. 406–410.

"Efficient Routing and Scheduling Algorithms for Optical Networks" by Aggarawal, et al., 5th—Annual Symposium on Discrete Algorithms, Jan. 1994, Chapter 46, pp. 412–423.

"Bounds on the Number of Wavelengths Needed in WDM Networks" by Barry, et al., LEOS 92 Summer Tropical Meeting Digest, Aug. 1992, pp. 21–22.

Dynamic Wavelength Allocation in A11–Optical Ring Networks'. by Gerstel, et al., IEEE. International Conference on Communications, vol. I, 1997, pp. 432–436.

"Optical Networking in the European Acts Program" by Hill, et al., Optical Fiber Communication OFC '96, vol. 2, Feb.–Mar. 1996, pp. 238–239.

"Effects of Wavelength Routing and Selection Algorithms on Wavelength Conversion Gain in WDM Optical Networks" by Karasan, et at., ICC '96, Workshop on WDM Network Management and Control, Jun. 1996,299–305.

"Design of the Optical Path Layer in Multiwavelength Cross–Connected Networks" by Wauters, et al., IEEE Journal on Selected Areas in Communications, vol. 14, No. 5, Jun. 1996, pp. 881–892.

"A Wavelength Routing Approach to Optical Communications Networks," by Hill, Proc. IEEE INFOCOM '88, 1998.

"Models of Blocking Probability in A11–Optical Networks with and without Wavelength Changers" by Barry, et al, 14th Annual Joint Conference of the IEEE Computer and Communications Soc., INFOCOM '95, Apr. 1995, vol. 2, pp. 402–412.

"Routing and Wavelength Assignment Methods in single–Hop All–Optical Networks with Blocking" by Birman, et at., 14 Annual Joint Conference of the IEEE Computer and Communications Soc., INFOCOM '95, Apr., 1995, vol. 2, pp. 431–438.

"Routing in a Linear Lightwave Network" by Bala, et al., IEEE/ACM Transactions on Networking, vol. 3, No. 4, Aug. 1995, pp. 459–469.

"Benefits of 'Minimal' Wavelength Interchange in WDM Rings" by Bala, et at., 1997 Conference on Optical Fiber Communications, Feb. 1997, pp. 120–121.

"Design of Wavelength–Routed Optical Networks for Circuit Switched Traffic" by Banerjee, et al., GLOBECOM: Global Telecommunications Conference, Nov. 1996, pp. 306–310.

"Project Learn–Light Exchangeable, Add/Drop Ring Network" by Hofmeister, et al., OFC '97, Dallas, Texas, Feb. 16–21, 1997.

"WDM All–Optical Networks" by Hudgings, et al., EE 228A Project Report, University of CA at Berkley, Fall 1996, pp. 1–25.

"WDM All–Optical Networks" by Hudgings, et al., EE 228A Project Report, University of CA at Berkley, Fall 1996, pp. 1–26.

"Dense WDM Mandates Advanced Passive Component Requirements" by Polinsky, Lightwave Magazine, Feb. 1996, vol. 13, Issue 2.

"Design, Analysis, and Implementation of Wavelength–Routed All–Optical Networks: Routing and Wavelength Assignment Approach" by Yoo, et al., Department of Electrical and Computer Engineering, Stevens Institute of Technology, May 1997.

"Design and Analysis of a Hierarchical Scalable Photonic Architecture" by Dowd, et al., Proceedings of the Second International Symposium on High Performance Distributed Computing, Jul. 20–23, 1993, pp. 289–295.

"First Multiwavelength Network Demonstrated" Optoelectronics, Mar. 1995, V 01. 5, No. 7.

"Wavelength Division Multiplexing" by McCann, et al., Enterprise Systems Journal, Jul. 1997, vol. 12, No. 7.

"WDM Ring Network Using a Centralized Multiwavelength Light Source and Add–Drop Multiplexing Filters" by Sharma, et al., Journal of Lightwave Technology, Jun. 1997, vol. 15, No. 6, pp. 917–929.

"Optical Interconnection Using Shuffle Net Multihop Networks in Multi–Connect Ring Topologies" by Karol, AT&T Bell Laboratories, ACM, 1988, pp. 25–34.

"High–Speed Local Area Networks and Their Performance: A Survey" by Abeysundara, et al., ACM Computing Surveys, Jun. 1991, vol. 23, No. 2, pp. 221–264.

"High Performance Interprocessor Communication Through Optical Wavelength Division Multiple Access Channels" by Dowd, ACM, 1991, pp. 96–105.

"Topologies for Wavelength–Routing All–Optical Networks" by Marsan, et al., IEEF/ACM Transactions on Networking, Oct. 1993, vol. 1, No. 5, pp. 534–546.

"Demonstrating Next–Generation Optical Transmissions" by Scott, et al., Telesis Bell–Northern Research Ltd., Dec. 1994, Issue 99, Start p. 15.

"Next–Generation Network Architectures and Technology Platforms" by Beaumont, et al., Telesis Bell–Northern Research Ltd., Oct. 1995, Issue 100, start p. 164.

"Sonet Transport Catches a Wave" by Wirbel, Electronic Engineering Times, Sep. 16, 1996.

"New Functional Multiaddress Channel Selective Terminal Using an Arrayed Waveguide Grating Multiplexer With Cross–Connect Loopback Paths" by Tachikawa, et al., IEEE Proceedings, Optoelectron, Oct. 1995, vol. 142, No. 5, pp. 219–224.

"GEMNET: A Generalized, Shuffle–Exchange–Based, Regular, Scalable, Modular, Multihop, WDM Lightwave Network" by Ioess, et al., IEEF/ACM Transaction on Networking, Aug. 1995, vol. 3, No. 4, pp. 470–476.

"A Comparative Study of Single Hop WDM Interconnections for Multiprocessors" by Desai, et al., ACM, 1995, pp. 154–163.

"All–Optical Path Protection in the 'Prometo' Test Bed: An Unidirectional WDM Transparent Self Healing Ring in a Field Environment" by Arecco, et al., IEEE, 1997, pp. 392–393.

"Optical Path Technologies: A Comparison Amond Different Cross–Connect Architectures" by Iannone, et al., IEEE Journal of Lightwave Technology, Oct. 1996, vol. 14, No. 10, pp. 2184–2196.

"Optical Digital Cross–Connect System Using Photonic Switch Matrices and Optical Amplifiers" by Shiragaki, et al., IEEE Journal of Lightwave Technology, Aug. 1994, vol. 12, No. 8, pp. 1490–1496.

"Optical Path Cross–Connect System Architecture Suitable for Large Scale Expansion" by Watanabe, et al., IEEE Journal of Lightwave Technology, Oct. 1996, vol. 14, No. 10, pp. 2162–2172.

"A Passive Protected Self–Healing Mesh Network Architecture and Applications" by Wu, IEEE/ACM Transactions on Networking, Feb. 1994, vol. 2, No. 1, pp. 40–52.

"Comparison of Classical and WDM base Ring Architecture" by Blain, et al., Broadband Superhighway, 1996, pp. 261–268.

"A Fully Transparent Fiber–Optic Ring Architecture for WDM Networks" by M. Irshid, et al., Journal of Lightwave Technology) vol. 10, No. 1, Jan. 1992.

"Acoustooptic Tunable Filters in Narrowband WDM Networks: System Issues and Network Applications" by K. Cheung, et al., IEEE Journal Selected Areas in Communications, vol. 8, No. 6, Aug. 1990.

"Integrated Optical Amplifier for Fast Phase Modulated Signals" by M. Kull, et al., Journal of Lightwave Technology, vol. 7, No. 2, Feb. 1989.

"Optically Restorable WDM Ring Network Using Simple Add/Drop Circuitry" by B. Glance, et al., Journal of Lightwave Technology, vol. 14, No. 11, Nov. 1996.

"Scalable Multihop WDM Passive Ring with Optimal Wavelength Routing" by D. Guo, et al., Journal of Lightwave Technology, vol. 14, No. 6, Jun. 1996.

"Wavelength–Tunable Optical Filters: Applications and Technologies" by H. Kobrinski, et al. IEEE Communications Magazine, Oct. 1989.

"A Fast–Tunable Optical Transmitter for Ultrahigh–Speed All–Optical Time–Division Multiaccess Networks" by C. Chan, et al., IEEE Journal on Selected Areas in Communications, vol. 14, No. 5, Jun. 1996.

"Architectural Analysis of Multiple Fiber Ring Networks" Employing Optical Paths by N. Nagatsu, et al., Journal of Lightwave Technology, vol. 15, No.n10, Oct. 1997.

"Two–Stage Fabry–Perot Filters as Demultiplexers in Optical FDMA LAN's" by A. Saleh, et al., Journal of Lightwave Technology, vol. 7, No. 2, Feb. 1989.

"Waveguide Electrooptic Switch Arrays" by R. Alferness, et al., IEEE Journal on Selected Areas in Communication, vol. 6, No. 7, Aug. 1988.

"A Photonic Wavelength–Division Switching System Using Tunable Laser Diode Filters" by Suzuki, et al., Journal of Lightwave Technology, vol. 8, No. 5, May 1990.

"Issues in Routing for Large and Dynamic Networks," by Hagouel, Ph.D. dissertation, Columbia University, NY 1983.

"An 8 mm length Nonblocking 4×4 Optical Switch Array" by H. Inoue, et al., IEEE Journal on Selected Areas in Communication, vol. 8, No. 6, Aug. 1990.

"Multi–wavelength Lightwave Networks for Computer Communication," by Ramaswarni, IEEE Commun. Mag., vol. 31, pp. 78–88, Feb. 1993.

"Cross–connect network demonstration in a HDWDM Optical network using two–electrode DFB LDs as tunable sources" by A. Hamel, et al., Eleventh Annual Conference on European Fibre Optic Communications and Networks, The Hague, Jun. 30–Jul. 2, 1993.

"Efficient N×N Star Couplers Using Fourier Optics" by C. Dragone, et al., Journal of Lightwave Technology, vol. 7, No. 3, Mar. 1989.

"Integrated Optical Multi–/Demultiplexer Using Acoustooptic Effect for Multiwavelength Optical Communications" by N. Goto, et al., IEEE Journal on Selected Areas in Communication, vol. 8, No. 6, Aug. 1990.

"L.E.D. Wavelength Division Multiplexing" by A. Hamel, et al., Proceedings Fiber Optics Broadband Networks, Cannes, France Nov. 28–29, 1985.

Integrated–Optic Acoustically–Tunable Filters for WDM Networks. by D. Smith, et al., IEEE Journal on Selected Areas in Communications, vol. 8, No. 6, Aug. 1990.

"Stable ultra–narrow bandpass filters" by M. Scobey, et al., Proceedings SPIE; Optical Thin Films IV New Developments, San Diego, CA. Jul. 25–27, 1994.

"Silica–Based Integrated Optic Mach–Zehnder Multi/Demultiplexer Family with Channel Spacing of 0.01–250 nm" by N. Takato, et al., IEEE Journal of Selected Areas in Communication, vol. 8, No. 6, Aug. 1990.

"Star–Coupler Optical Cross–Connect Switch Experiments with Tunable Receivers" by K. Eng, et al., IEEE Journal on Selected Areas in Communication, vol. 8, No. 6, Aug. 1990.

"A Reconfigurable Optoelectric Wavelength Converter based on an Integrated Eletroabsorption Modulated Laser Array," by Raybon, Aug. 15, 1997, pp. 38–39.

"The Fiber–Optic Challenge of Information Infrastructures" by P. Green, Jr., et al., National Information Infrastructure White Paper, Sep. 26, 2000.

"Viabilities of the Wavelength–Division–Multiplexing Transmission System Over an Optical Fiber Cable" by T. Miki, et al., IEEE Transactions on Communications, vol. Com–26, No. 7, Jul. 1978.

"Wavelength Division Multiplexing" by H. Hendricks, et al., SPffi; Fiber Optic Communication Technology, vol. 512, 1984.

"WDM Passive Star Networks: Receiver Collisions avoidance Algorithms Using Multifeedback Learning Automata" by G. Papadimitrou, et al., Computer Communications, vol. 19 (6–7), Jun. 1996.

"Wavelength–Division Multiplexers/Demultiplexers" by S. Ishikawa, et al., NEC Research and Development, No. 59, act. 1980.

"Properties of optical switching networks with passive or active space switches" by L. Gillner, et al., IEEE Proceedings–J. vol. 140, No. S, Oct. 1993.

"Review and Status of Wavelength–Division–Multiplexing Technology and Its Application" by H. Ishio, et al., Journal of Lightwave Technology, vol. LT–2, No. 4, Aug. 1984.

"A four channel 10–nanometer spacing wavelength demultiplexer" by H. Hendricks, et al., Proceedings SPIE; Fiber Optics Multiplexing and Modulation, Arlington, VA, Apr. 7, 1983.

"Monolithic Integration of an InGaAs PIN Photodiode, Two InGaAs Column Gate FETs and an InGaAsP Laser for Optical Regeneration " by S. Rata, et al., 17th Conference on Solid State Devices and Materials, Tokyo, 1985.

"WDM–Based Local Lightwave Networks: Part I: Single–Hop Systems," by Mukhetjee, IEEE Commun. Mag., val. 6, pp. 12–27, May 1992.

"Transport Network Involving a Reconfigurable WDM Network Layer—A European Demonstration," by S. Johansson, IEEF/OSA J. Lightwave Technol., vol. 14, pp. 1341–1348, Jun. 1996.

"Purely Optical Networks for Terbit Communication." by Chlamtac, A. Ganz, and G. Kanni, I Proc. IEEE INFOCOM '89,1989.

"Lightpath (Wavelength) Routing in Large WDM Networks," by Chlamtac, IEEE Journal on Selected Areas in Communications, vol. 14, pp. 909–913, Jun. 1996.

"Multiwavelength Reconfigurable WDM/ATM/SONET Network Testbed", by Chang, Journal of Lightwave Technology, Jun. 1996, vol. 14, No. 6.

"Optical Components for WDM Lightwave Networks," by Borella, Proceedings of the IEEE, vol. 85, No. 8, Aug. 1997.

"Novel Wavelength–Division–Multiplexed Ring Network Architecture Using Optical Path Technology for Multiple Services and Simple Media Access Control Procedure," by Oguchi, Fiber and Integrated Optics, 1997.

"Linear Lightwave Networks: Performance Issues," by T .Stem, et al., IEEE/OSA J. Lightwave Technol., vol. 11, May/Jun. 1993.

"Linear Lightwave Networks: How far can they go?," by T. Stern, Proc. IEEE GLOBECOMM '89, 1989.

"Data Structures and Network Algorithms," by Tarjan, Philadelphia, PA: SIAM, 1983.

"A Wavelength Convertible Optical Network," by K. Lee, et al., IEEE/OSA J. Lightwave Technol., vol. 11, May/Jun. 1993.

"Multireflection Optical Multi/Demultiplexer Using Interference Filters," by Nosu, Electronic Letters, vol. 15, No. 14, July S, 1979.

"Tunable Optical–Wavelength Conversion Using a Multi–electrode Distributed–Feedback Laser Diode With a Saturable Absorber," by Kawaguchi, Electronic Letters, vol. 23, No. 20, Sep. 24, 1987.

"Narrowband Position–Tuned Multilayer Interference Filter For Use In Single–Mode–Fibre Systems," by Lissberger, Electronic Letters, vol. 21, No. 18, Aug. 29, 1985.

"Optical Multiplexer/Demultiplexers Using Thin–Film Optical Filters," by Miyazaki, Dec. 1980.

"The Evolution of the Existing Carrier Infrastructure," by Traupman, IEEE Communications Magazine, Jun. 1999.

"Performance Evaluation of CROWNS: WDM Multiring Topologies," by Wong, IEEE International Conference on Communications, Jun. 18–22, 1995.

"A minimum interference routing algorithm for a linear lightwave network" K. Bala and T. Stern Proc. IEEE Globecom, Phoenix, Dec. 1991.

"The case for opaque multiwavelength optical networks," by K. Bala, R Cordell, and E. Goldstein, Proc. LEOS Summer Topical Meeting, Keystone, CO, Aug. 1995.

"Algorithms for routing in a linear lightwave network," by K. Dala and T. E. Stem, Proc. IEEE Infocom '91, Miami, Apr. 1991.

"Cost Effective Traffic Grooming in WDM Rings," by Gerstel, Ramaswami and Sasaki, IEEE Infocom, San Francisco, Mar. 29–Apr. 2, 1998, pp. 69–77.

"Multicasting in linear lightwave networks," by K. Bala, K. Petropoulos, and T. E. Stern Proc. IEEE Infocom '93, San Francisco, Mar. 1993.

"Some quantum effects in information channels," by T. E. Stern, IRE Transactions on Information Theory, IT–6:435–440, 1960.

Syuji Suzuki et al, Photonic Wavelength–Division and Time–Division Hybrid Switching Networks for Large Line–Capacity Broadband Switching Systems, Nov. 28–Dec. 1, 1988, IEEE Global Telecommunications Conference & Exhibition, vol. 2 of 3.

Hiroaki Harai et al, Performance Evaluation of Multicast Routing Methods in Optical Switching Networks with Multiple Wavebands, Jan. 1997, Electronics and Communication in Japan, Part 1 vol. 83, No. 2, pp. 23–34.

"Algorithms For Routing in a Linear Lightwave Network" by Krishna Bala, et al., IEEE INFOCOM '91 Tenth Annual Joint Conference of the IEEE Computer and Communications Societies Networking in the 90's, Apr. 1991, pp. 1–9.

"Routing in Linear Lightwave Networks" by K. Bala, Ph.D. dissertation, Columbia Univ., pp. 1–31.

"The Case for Opaque Multiwavelength Optical Networks" by Bala IEEE, LEOS, pp. 58–59.

"WDM Network Economics" by K. Bala, R.H. Cardwell, D. Feddor, et al., National Fiber Optics Engineers Conference, Sep. 1996, pp. 163–174.

"Wavelength–Routed Optical Networks Using Coherent Transmission" by M.C. Brain and P. Cochrane, IEEE International Conference on Communications '88, Jun. 1988, vol. 1, pp. 26–31.

"Markov–Modulated Flow Model for the Output Queues of a Packet Switch" by Jeane S.C. Chen, Roch Guerin and Thomas E. Stern, IEEE Transactions on Communications, Jun. 1992, vol. 40 No. 6, pp. 1098–1110.

"Throughout Analysis, Optimal Buffer Allocation, and Traffic Imbalance Study of a Generic Nonblocking Packet Switch" by Jeane S.C. Chen and Thomas E. Stern, IEEE Journal on Selected Areas in Communications, Apr. 1991, vol. 9, No. 3, pp. 439–449.

"A Multi–Fiber Ring Architecture for Distributed Lightwave Networks" by Kai Y. Eng, IEEE International Conference on Communications '88, Jun. 1988, vol. 3, pp. 1490–1496.

Fiber Optic Networks by Paul E. Green, Jr., 1993, pp. 119–129, 281–284, 371–391, 231–272.

"A WDM Cross–Connected Star Multihop Optical Network" by Mansour I. Irshid and Mohsen Kavehrad, IEEE SUPERCONM/International Conference Communications '92, 1992, vol. 3, pp. 1451–1455.

"Rooted Routing in Linear Lightwave Networks" by Milan Kovacevic and Mario Gerla, IEEE INFOCOM '92, 1992, pp. 39–48.

"Performance Impact of Partial Reconfigurability in Lightwave Networks" by Jean–Francois P. Labourdette, IEEE, 1995, pp. 683–691.

"Performance Impact of Partial Reconfiguration of Multihop Lightwave Networks" by Jean–Francois P. Labourdette, IEEE/ACM Transactions on Networking, Jun. 1997, vol. 5, No. 3, pp. 351–358.

"An Experiment on Photonic Wavelength–Division and Time–Division Hybrid Switching" by M. Nishio, et al., Tech. Dig. Photon. Switch. Top. Meet., Opt Soc. Amer. 1989, pp. 250–253.

"A Linear Lightwave Benes Network" by Gerard R. Pieris and Galen H. Sasaki, IEEE/ACM Transactions on Networking, Aug. 1993, vol. 1, No. 4, pp. 441–445.

"The Universality of Multidimensional Switching Networks" by Jacob Sharony et al., IEEE/ACM Transactions on Networking, Dec. 1994, vol. 2, No. 6, pp. 1 602–612.

"The Wavelength Dilation Concept in Lightwave Networks–Implementation and SyStern Considerations" by Jacob Sharony, et al., Journal of Lightwave Technology, May/Jun. 1993, vol. 11, No. 5/6, pp. 900–907.

"Wavelength Dilated Switches (WDS)–A New Class of High Density, Suppressed Crosstalk, Dynamic Wavelength–Routing Crossconnects" by Jacob Sharony, et al., IEEE Photonics Technology Letters, Aug. 1992, vol. 4, No. 8, pp. 933–935.

"Wavelength–Rearrangeable and Strictly Nonblocking Networks" by J. Sharony, et al., Electronics Letters, Mar. 12, 1992, vol. 28, No. 6, pp. 536–537.

"Analysis of Separable Markov–Modulated Rate Models for Information–Handling Systems" by Thomas E. Stern et al., Advances in Applied Probability, 1991 vol. 23, No. 1, pp. 105–139.

"Linear Lightwave Networks: Performance Issues" by T. E. Stern et al., Journal of Lightwave Technology, May/Jun. 1993, pp. 937–950.

Linear Lightwave Networks: How far Can They Go? by T. E. Stern, GLOBECOM '90 1990, pp. 1866–1872.

"Performance Evaluation of a Packet Voice SyStern" by S. Ganguly, et al., IEEE Transactions on Communications, Dec. 1989, vol. 37, No. 12, pp. 1394–1397.

"Multi–Fiber Linear Lightwave Networks" by P.C. Wong and K. H. Chan, IEEE, 1993, pp. 138–143.

Joseph IP, Dense WDM Components For Optical Add–Drop Applications, Sep. 22–23, 1997.

S. J. Madden, et al., Metropolitan Area Optical Networking, Sep. 14–17, 1998.

P. Bonefant, et al., A Strategy for Increasing the Capacity of Sonet Transport System Using 2–Channel WDM over 1301 rim–Optimized Single–Mode Fiber.

D. C. Johnson, et al., New Design Concept for a Narrowband Wavelength –Selective Optical, Electronics Letters, Jun. 18m, 1987, vol. 23, No. 13, pp. 668–669.

G. Nykolak, et al., All–Fiber Multiwavelength Add–Drop Multiplexer. OFC '97 Technical Digest, Thursday Morning, pp. 281–282.

G. R. Hill, Wavelength Domain Optical Network Techniques, Proceedings of the IEE, vol. 77, No. 1, Jan. 1989, pp. 121–132.

Manish Sharma, et al., Four–Channel High–Density Optical FDM Add—Drop Multiplexing Filter for Use in Ring Networks, OFC '94 Technical Digest, Thursday Morning, pp. 214–216.

Daniel Y. Al–Salameh, et al., Optical Networking, Bell Labs Technical Journal, Jan.–Mar. 1998, pp. 39–61.

John J. Prisco, et al., The Evolution of Telecommunications in the RAN, Nov. 1985, vol. 23, No. 11, IEEE Communications Magazine.

First Multiwavelength Network Demonstrated, Mar. 1995, Optical Materials and Engineering News, 2 pages.

Andres Albanese, et al., Loop Distribution Using Coherent Detection, Jul. 1988, IEEE Journal on Selected Areas in Communications, vol. 6, No. 6. 959–973.

Matthew S. Goodman, Multiwavelength Networks and New Approaches to Packet Switching, Oct. 1989, IEEE Communications Magazine, pp. 27–35.

M. L. Loeb, et al., High–Speed Data Transmission on an Optical Fiber Using a Byte–Wide WDM System, Aug. 1988, Journal of Lightwave Technology, vol., 4, No. 8.

Thilo Gipser et al., An All–Optical Network Architecture, May 1996, Journal of Lightwave Technology, vol. 14, No. 5.

H. Fujita, et al., Large Capacity Optical Digital Transmission System, 1983, vol. 32, No. 4.

J. R. Stauffer, FT3C—A Lightwave System for Metropolitan and Intercity Applications, Apr. 1983, IEEE Journal on Selected Areas in Communications, vol. SCA–1, No. 3.

M. Stern et al., Three–Channel, High–Speed Transmission Over 8 km Installed, 1300 nm Optimized Single–Mode Fibre Using 800 nm CD Laser and 1300/1500 nm LED Transmitters, Feb. 4, 1998, Vo., 24, No. 3.

M. Fujiwara, et al., A Coherent Photonic Wavelength –Division Switching System For Broadband Networks, $14^{th}$ European Conference on Optical Communication, pp. 139–142.

S. S. Wagner et al., Experimental Demonstration of a Passive Optical Subscriber Loop Architecture, 1989, Electronics Letters, vol. 24, No. 6.

H. Kobrinski, et al., Demonstration of High Capacity in the Lambdanet Architecture: A Multiwavelength Optical Network, 1987, Electronic Letters, vol. 23, No. 6.

M. S. Goodman, et al., Application of Wavelength Division Multiplexing to Communication Network Architectures, Jun. 22–25, 1996, IEEE International Conference on Communications, vol. 2., pp. 931–933.

JDS Fitel Inc., WDM Technology, Aug. 15, 1997, pp. 36.

Romagnoli et al., Tunable Erbium–Ytterbium Fiber Sliding–Frequency Soliton Laser, Journal Optical Society of America B, vol. 12, No. 1, Jan. 1995, pp. 72–76.

F. Ouellette, et al., Broadband And Wdm Dispersion Compensation Using Chirped Sampled Fibre Bragg Gratings, Electronics Letters, vol. 31, No. 11, May 25, 1995, pp. 899–901.

M.C. Farries, et al., Very Broad Reflection Bandwidth (44nm) Chirped Fibre Gratings And Narrow Bandpass Filters Produced By The Use Of An Amplitude Mask, Electronics Letters, vol. 30, No. 11, May 26, 1994, pp. 891–892.

W. Morey, et al., Photoinduced Bragg Gratings In Optical Fibers, Optics & Photonics News, vol. 5, No. 2, Feb. 1994, pp. 8–14.

E–Tek Dynamics, Inc, Catalog, 1995–1996, 124 pages.

E–Tek Dynamics, Inc. Catalog, 1997, 132 pages.

C.R. Giles, et al., Low–Loss Add/Drop Multiplexers For Wdm Lightwave Networks, IOOC–95, 4 pages.

T. Mizuochi, et al., All–Fiber Add/Drop Multiplexing of 6X10 Gbit/s Using A Photo–Induced Bragg Gating Filter For WDM Networks, OFC '96 Technical Digest, Wednesday Afternoon, pp. 116–117.

K. Bala, et al., Optical Wavelength Routing, Translation, and Packet/Cell Switched Networks, Journal of Lightwave Technology, vol. 14, No. 3, Mar. 1996, pp. 336–343.

G.R. Hill, A Wavelength Routing Approach to Optical Communications Networks, IEEE Infocom '88, Seventh Annual Joint Conference of the IEEE Computer and Communications Societies, Mar. 1988, pp. 0354–0362.

K. Bala, et al., A Minimum Interference Routing Algorithm for a Linear Lightwave Network, Globecom '91, Phoenix, Arizona, Dec. 2–5, 1991, Coundown to the New Millennium, pp. 1264–1269.

Rajiv Ramaswami, Multiwavelength Lightwave Networks for Computer Communication, IEEE Communications Magazine, Feb. 1993, vol. 31, No. 2, pp. 78–88.

* cited by examiner

ANCHOR 1.931000E+14  1.552524E-06
DELTA  2.000000E+11  1.608000E-09

FIG. 2A

| FREQUENCY (Hz) | WAVELENGTH (MICRON) | INITIAL (MICRON) | ITU (MICRON) | EDFA (MICRON) | 4-λ (MICRON) | 2-λ (MICRON) |
|---|---|---|---|---|---|---|
| 1.8810E+14 | 1.59379 | | | | | |
| 1.8830E+14 | 1.59210 | | | | 1.59210 | 1.59210 |
| 1.8850E+14 | 1.59041 | | | | 1.59041 | |
| 1.8870E+14 | 1.58873 | | | | 1.58873 | |
| 1.8890E+14 | 1.58704 | | | | 1.58704 | 1.58704 |
| 1.8910E+14 | 1.58536 | | | | | |
| 1.8930E+14 | 1.58369 | | | | | |
| 1.8950E+14 | 1.58202 | | | | 1.58202 | 1.58202 |
| 1.8970E+14 | 1.58035 | | | | 1.58035 | |
| 1.8990E+14 | 1.57869 | | | | 1.57869 | |
| 1.9010E+14 | 1.57703 | | | | 1.57703 | 1.57703 |
| 1.9030E+14 | 1.57537 | | | | | |
| 1.9050E+14 | 1.57371 | | | | | |
| 1.9070E+14 | 1.57206 | | | | 1.57206 | 1.57206 |
| 1.9090E+14 | 1.57042 | | | | 1.57042 | |
| 1.9110E+14 | 1.56877 | | | | 1.56877 | |
| 1.9130E+14 | 1.56713 | | | | 1.56713 | 1.56713 |
| 1.9150E+14 | 1.56550 | | | | | |
| 1.9170E+14 | 1.56386 | | | | | |
| 1.9190E+14 | 1.56223 | | | | 1.56223 | 1.56223 |
| 1.9210E+14 | 1.56061 | | | | 1.56061 | |
| 1.9230E+14 | 1.55898 | | | | 1.55898 | |
| 1.9250E+14 | 1.55736 | | | | 1.55736 | 1.55736 |
| 1.9270E+14 | 1.55575 | | | | | |
| 1.9290E+14 | 1.55413 | | | | | |
| 1.9310E+14 | 1.55252 | | | | 1.55252 | 1.55252 |
| 1.9330E+14 | 1.55092 | | | | 1.55092 | |
| 1.9350E+14 | 1.54932 | | | | 1.54932 | |
| 1.9370E+14 | 1.54772 | | | | 1.54772 | 1.54772 |
| 1.9390E+14 | 1.54612 | | | | | |
| 1.9410E+14 | 1.54453 | | | | | |
| 1.9430E+14 | 1.54294 | | | | 1.54294 | 1.54294 |
| 1.9450E+14 | 1.54135 | | | | 1.54135 | |

FIG. 2B

| | | | | | | |
|---|---|---|---|---|---|---|
| 1.9470E+14 | 1.53977 | | | | 1.53977 | |
| 1.9490E+14 | 1.53819 | | | | 1.53819 | 1.53819 |
| 1.9510E+14 | 1.53661 | | | | | |
| 1.9530E+14 | 1.53504 | | | | | |
| 1.9550E+14 | 1.53347 | | | | 1.53347 | 1.53347 |
| 1.9570E+14 | 1.53190 | | | | 1.53190 | |
| 1.9590E+14 | 1.53033 | | | | 1.53033 | |
| 1.9610E+14 | 1.52877 | | | | 1.52877 | 1.52877 |
| 1.9630E+14 | 1.52722 | | | | | |
| 1.9650E+14 | 1.52566 | | | | | |
| 1.9670E+14 | 1.52411 | | | | 1.52411 | 1.52411 |
| 1.9690E+14 | 1.52256 | | | | 1.52256 | |
| 1.9710E+14 | 1.52102 | | | | 1.52102 | |
| 1.9730E+14 | 1.51948 | | | | 1.51948 | 1.51948 |
| 1.9750E+14 | 1.51794 | | | | | |
| 1.9770E+14 | 1.51640 | | | | | |
| 1.9790E+14 | 1.51487 | | | | | |
| 1.9810E+14 | 1.51334 | | | | | |
| 1.9830E+14 | 1.51181 | | | | | |
| 1.9850E+14 | 1.51029 | | | | | |
| 1.9870E+14 | 1.50877 | | | | | |
| 1.9890E+14 | 1.50725 | | | | | |
| 1.9910E+14 | 1.50574 | | | | | |
| 1.9930E+14 | 1.50423 | | | | | |
| 1.9950E+14 | 1.50272 | | | | | |
| 1.9970E+14 | 1.50121 | | | | | |
| 1.9990E+14 | 1.49971 | | | | | |
| 2.0010E+14 | 1.49821 | | | | | |

FIG. 2B

WDM OPTICAL NETWORK AND SWITCHING NODE WITH PILOT TONE COMMUNICATIONS

This is a divisional application of U.S. patent application Ser. No. 08/917,784 filed Aug. 27, 1997.

FIELD OF THE INVENTION

The present invention relates to a method and apparatus for establishing communication over an optical network employing wavelength division multiplexing.

BACKGROUND OF THE INVENTION

The ever-increasing demand for bandwidth has spurred the growth of high speed transport networks. Currently, the key standard for use in such networks is SONET, which is an acronym for Synchronous Optical Network. The SONET standard defines a hierarchy of optical transmission rates over point-to-point and ring network topologies. For example, the SONET optical carrier—level 3 (OC-3) transmits at 155 Mb/s and OC-12 transmits at 622 Mb/s.

SONET was developed to provide a survivable transport infrastructure that could carry a range of different payload protocols and payload bit rates.

Survivability is achieved in SONET using a ring topology with a SONET-defined standard protocol for coordinating traffic restoration in the event of a failure. On a ring, there are always two diverse routes that can be used to interconnect any two nodes on the ring. In the event of a failure of one of those routes, spare capacity on the other route is used to restore the traffic affected by the failure. In SONET, every node must terminate the entire optical signal in order to be able to access every payload, even though typically a node would only access a small subset of the payloads and pass the rest of them downstream to other nodes. Termination of the entire optical signal is also required to give each node access to an automatic protection switching (APS) protocol that coordinates access to the spare capacity by the node during failure events. Unfortunately, this requirement of SONET to terminate the entire optical signal at every node makes upgrading the capacity of the ring a slow and costly process, because every node must be upgraded even though it may be that only one node requires the additional capacity.

In order to carry a variety of payloads and payload bit rates, the SONET standard defines a payload envelope structure into which all payloads must be mapped. This envelope is then carried within one timeslot within the time division multiplexed SONET signal. Although this provides a SONET network with the ability to carry a variety of payloads, a new payload cannot be transported until a mapping is defined and the interface circuit is developed and deployed. In addition, if there is insufficient spare capacity in the network to handle the new payload bit rate, then the entire network may have to be upgraded. Thus, SONET networks are not responsive to the needs of today's services, which are demanding greater capacity and introducing a wide range of protocols.

The networks of today's telecommunications carriers typically consist of an access portion that connects end-users to the carrier's network, and a transport portion (sometimes called backbone or core network) that provides the interconnection between the access networks. The access portion of the network is under pressure to provide a greater variety of signal types such as asynchronous transfer mode (ATM), asynchronous digital subscriber loops (ADSL), and SONET, to handle the emerging diversity of services. These new payloads also tend to require greater bit rates to support the underlying services. Transport networks are under pressure to provide more capacity due to the higher bit rate services coming out of the access networks as well as the growth in the number and size of the access networks reflecting the growth in the number of end users.

An object of the invention is to alleviate the limitations in SONET-based networks.

SUMMARY OF THE INVENTION

According to the present invention there is provided a communications network employing wavelength division multiplexing, comprising a plurality of nodes; an optical transmission medium interconnecting said nodes, said transmission medium being capable of a carrying a plurality of wavelengths organized into bands; and an interface at each node for dropping a band associated therewith, adding a band carrying traffic for another node, and passively forwarding other bands; whereby communication can be established directly between a pair of nodes in said network sharing a common band without the active intervention of any intervening node.

A network in accordance with the invention is protocol and bit rate independent and is therefore more responsive than SONET to the demands placed on the access and transport networks of telecommunications carriers. Each payload is carried on separate optical wavelengths and payloads are multiplexed using wavelength division multiplexing techniques.

A band consists of a group of closely spaced wavelengths. A guard space normally exists between the bands to allow for simple filtering of a band out of the overall spectrum. For example, a band may consist of four wavelengths spaced at 1.6 nm intervals giving a total width for the band of 4×1.6=6.4 nm. With a guard band of 3.2 nm, the overall band spacing would be 6.4+3.2=9.6 nm.

A band is associated with the connection between two nodes, such that if, for example, node A wishes to communicate with node C via intervening node B, both node A and node C must access (add/drop) the same band, say band X. Node A would transmit to node C on band X, which would be passively forwarded by intervening node.

The use of bands as distinct from discrete wavelengths allows the filter specifications to be relaxed in the area of sideband roll-off slope since there are cascaded filters involved at each node. A primary (or band) filter discriminates a band of wavelengths. Further sub-division into specific channels is done with a narrow width filter(s) that is sub-tended after the band filter.

The use of a multi-level filtering approach is more energy efficient than other arrangements for ring networks. This is due to the fact that the band filter is the primary filter element that is repeated around the ring. As nodes are added to the ring, the attenuation loss due to the band filter element does not rise as fast as the case where individual wavelengths are filtered out at a node with the residual band being passed on.

The interface is typically in the form of a filter which separates out the band to be dropped and forwards the other bands by reflection. The filter acts as a multiplexer/demultiplexer which drops and adds the band associated with the node from the transmission medium.

The filter is preferably an interference filter with minimal loss, preferably less than 1 dB, and typically 0.5 dB. The division of the wavelength spectrum into bands, each associated with a node, is an important factor in reducing the loss at the passive filter. If individual wavelengths were employed, losses in the order of 3 to 6 dB could be expected, and the maximum size of the network would be very much restricted.

An important advantage of the present invention is that each wavelength essentially provides a protocol independent high speed bit pipe between a pair of nodes with minimal loss.

A node in one embodiment may also include a cross connect switch for changing wavelengths. For example, if a path is established between node A and node C over band c, and between node C and node F over band f, and no path exists between node A and node F, node A can send traffic for node F first to node C, which drops the band c, detects that the traffic is for node F, and passes it through the cross connect to forward the traffic in band f, which will be dropped by node F.

The optical path for the network is thus passive except for nodes where wavelengths are add/dropped. The system also has low overall loss in any wavelength path so that no optical amplifiers need be employed to achieve a 30 km ring circumference. The overall power loss budget is estimated at 30 dB.

In a typical maximum configuration system, approximately ⅓ of the optical loss is in the fiber (~9 dB) and approximately ⅓ the loss is in the optical add/drop filters (16 band filters @0.5 db=8 dB). The remainder of the 30 dB optical power budget is reserved for connector loss, splices and aging of components.

According to another aspect of the invention there is provided a method of establishing communication over an network employing wavelength division multiplexing and having a plurality of nodes interconnected by an optical transmission medium capable of carrying a plurality of wavelengths organized into bands, the method comprising the steps of sending traffic destined for a remote node in a band associated with the remote node; passively forwarding said band at any intervening nodes; and dropping said band at said remote node to extract said traffic destined therefor.

The invention still further provides an interface device for use in an optical network employing wavelength division multiplexing, comprising a demultiplexer for dropping a predetermined band of wavelengths from the network at a node, means for converting optical input signals from said demultiplexer to electrical output signals, means for generating optical output signals from electrical input signals, a multiplexer for adding said optical output signals in a predetermined band to the network, said demultiplexer and multiplexer being arranged to forward passively optical signals in bands other than said band that is dropped.

In another aspect the invention provides a fiber optic wavelength division multiplexed ring comprising a plurality of switching nodes, means for generating a plurality of wavelengths organized in to bands on said ring, and means for transmitting maintenance channel data on at least one of said wavelengths as a pilot tone.

The maintenance channel can conveniently be injected by modulating the bias current of the device generating the wavelengths, normally a laser.

BRIEF DESCRIPTION OF THE DRAWINGS

The invention will now be described in more detail, by way of example only, with reference to the accompanying drawings, in which.

DESCRIPTION OF THE PREFERRED EMBODIMENTS

Figure 1:
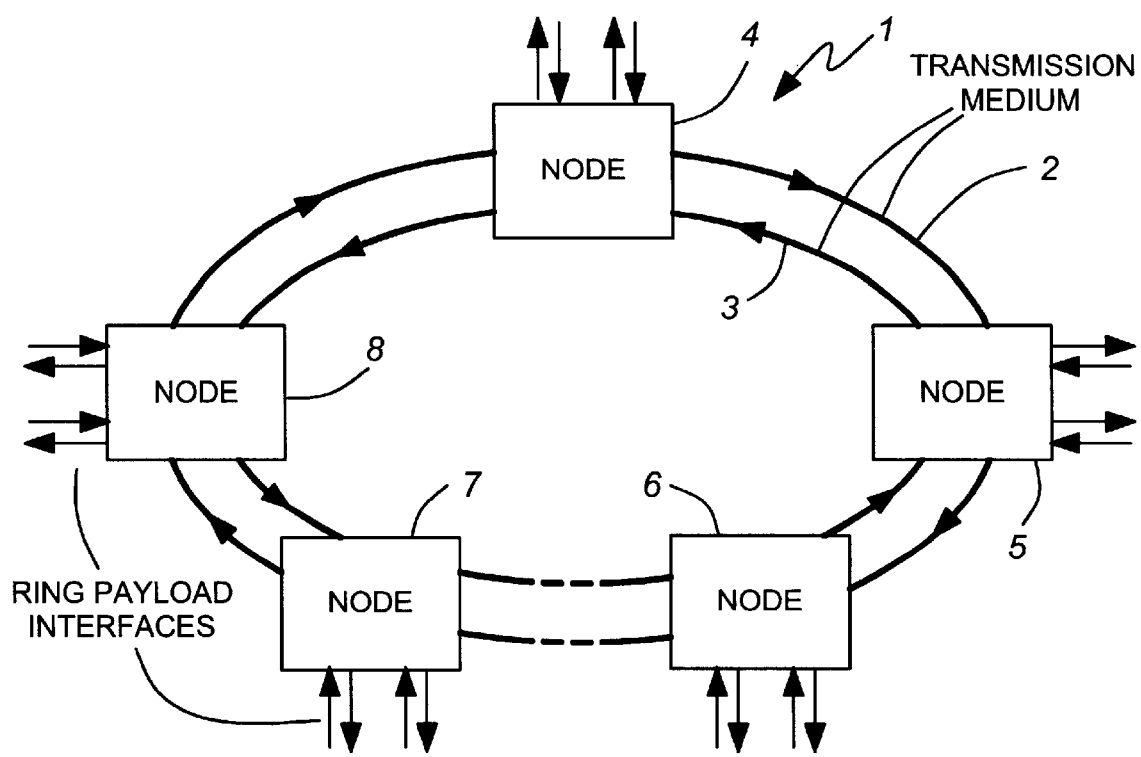
FIG. 1 is a block diagram showing the physical layout of a wavelength division multiplexed (WDM) bi-directional ring network.

Referring now to FIG. 1, a WDM (Wavelength division Multiplexed) ring network generally referenced 1 consists of two counter rotating rings 2, 3 containing a plurality of nodes 4, 5, 6, 7, 8 providing interfaces to the rings 2, 3. It will be understood that FIG. 1 shows the physical layout of the network. The rings 2, 3 physically consist of optical fibers, which are capable of carrying multiple wavelengths generated by lasers in the nodes. The interconnectivity between the nodes is provided by WDM connections in a manner to be described.

Figure 2:
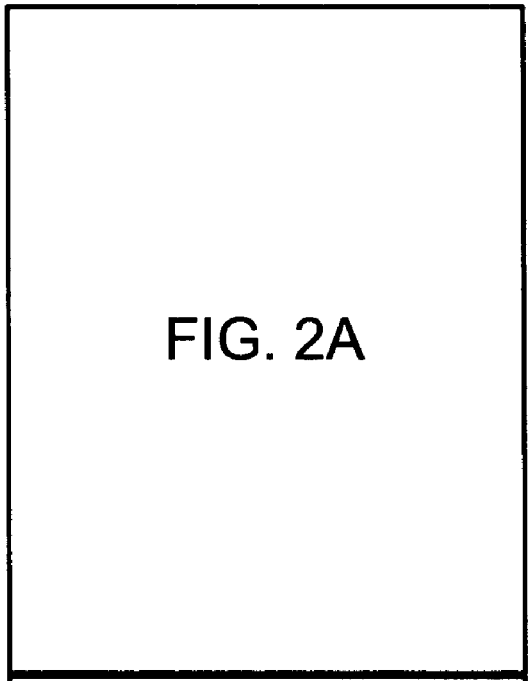
FIG. 2 is a chart of the bands of wavelengths employed in a typical system in accordance with the invention.
Figure 2:
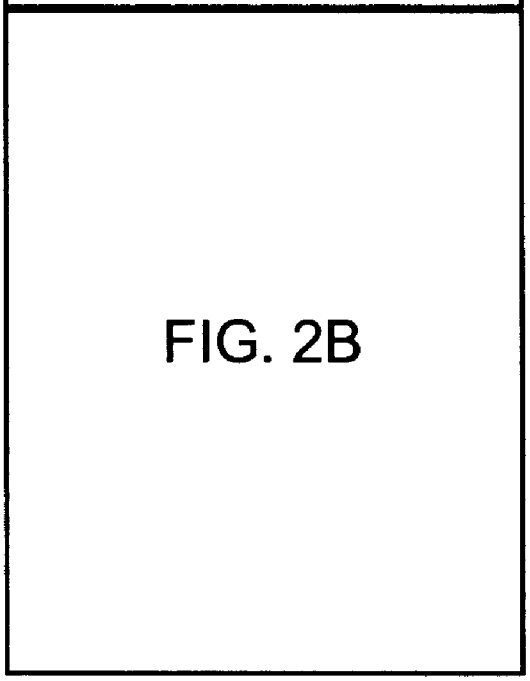

Each ring may carry, for example, 16 or 32 wavelengths divided into eight bands, which provide the interconnectivity between the nodes. Typically there are either two or four wavelengths per band. With eight bands, there are therefore a total of 16 wavelengths per ring for two wavelengths per band or 32 wavelengths in the case of four wavelengths per band, for example, spaced at 1.6 nm with a guard band of 3.2 nm for a total spacing of 9.6nm per band. FIG. 2 shows a typical distribution of bands and wavelengths. Typically the maximum number of nodes is eight, assuming eight bands.

Each node 4, 5, 6, 7, 8, adds/drops a predetermined band of wavelengths specific to that node. For example, node 6 might drop the 1.52411 to 1.51948 μm band, which includes wavelengths at 1.52411, 1.52256, 1.52102, and 1.51948 μm. In order to establish a path between node 4 and node 6, node 4 transmits to node 6 in this band on both counter rotating rings 2, 3. This band is passively reflected by nodes 5, 7, 8 and forwarded to node 6, which drops the band and extracts the traffic. In accordance with the principles of the invention, the bands of wavelength thus permit direct, protocol independent connections to be made between any nodes on the ring without the intervention of any intermediate node. The nodes on the ring can be interconnected in any traditional manner, for example, in star or mesh connections, by establishing waveband connections between desired pairs of nodes.

A typical node with a wavelength conversion function will be described in more detail with reference to FIG. 3.

Demultiplexers 10 and multiplexers 11 are shown connected into the fiber optic rings 2, 3. Demultipexers 10 drop, and multiplexers 11 add, a specific band of wavelengths associated with the node. Physically the MUX/DEMUX 10, 11 each consist of a single high performance optical interference filter that transmits the selected band to be dropped/added and passively reflects the remaining bands. The filters can be, for example, dichroic filters, Bragg grating filters based on circulators, and Bragg grating based on fused biconic taper. A suitable filter is made by JDS Fitel of Ottawa, Canada. Such filters offer low through-path loss (<1 dB), and reasonable (<2 db) add/drop loss. The bands 13 not dropped by the demultiplexers 10 are passively forwarded through the node.

In physical terms, the bands 13 of wavelengths that are not destined for a particular node are passively reflected on to the next node and so on until they reach the destination node where they are dropped in the manner described.

The dropped band 12 from each ring 2, 3 is passed to a second fine optical filter 19, which separates the dropped band into the individual wavelengths. The subdivided wavelengths are passed to electro-optic converters 14, which generate electrical signals from the optical inputs. The electric signals are then passed to digital cross connect switch, which connects them to payload interface devices 16 providing access to the network. Alternatively, cross connect 15 permits switching between different wavelengths or bands. In the latter case, the cross connect 15 can be connected to additional MUX/DEMUX filters (not shown) provided at the same node for adding/dropping different bands either on the same ring or a different ring.

The adding of a band works in the same way as the dropping of a band in reverse. Electrical signals are converted to optical form in electro-optic converters 14 and passed to fine channel filters 18, which combine the specific band of wavelengths that it is desired to add. The output 18 of these filters is passed to MUX 11 and combined with the forwarded bands 13. In physical terms, the added band(s) is/are transmitted through the optical filter and combined with the forwarded bands 13, which are passively reflected.

The 'optimum' construction for a node filter is a 4, 6 or 10 port device having an in port, out port and 1, 2 or 4 'drop' ports and 1, 2 or 4 'add' ports. As there are eight bands, there will be eight varieties of the device, one per band. One such device is used where ever a band is to be add/dropped. Each port corresponds to a specific wavelength.

The filter is a highly integrated passive optical device. The design and construction of the filter is such that 1 wavelength (approx. 1 nm Bandwidth) is available from a 'drop' port and 1 wavelength (approx. 1 nm Bandwidth) is added to an 'add' port. By using identical band filters at two points on the ring, 1, 2 or 4 wavelengths can be used to implement a bi-directional 'communications' pipe between those points. These pipes are independent of any other wavelengths on the fiber ring so long as no other nodes use the same band filters. Each wavelength used in the system in effect serves as a transparent digital "bit pipe". Any specific formatting of data in a wavelength is to be carried out by sub-tending equipment. The system is not protocol dependent. The present invention employs bands to provide protocol independent direct connections between nodes on a physical ring, which in physical terms need not be adjacent.

Figure 3:
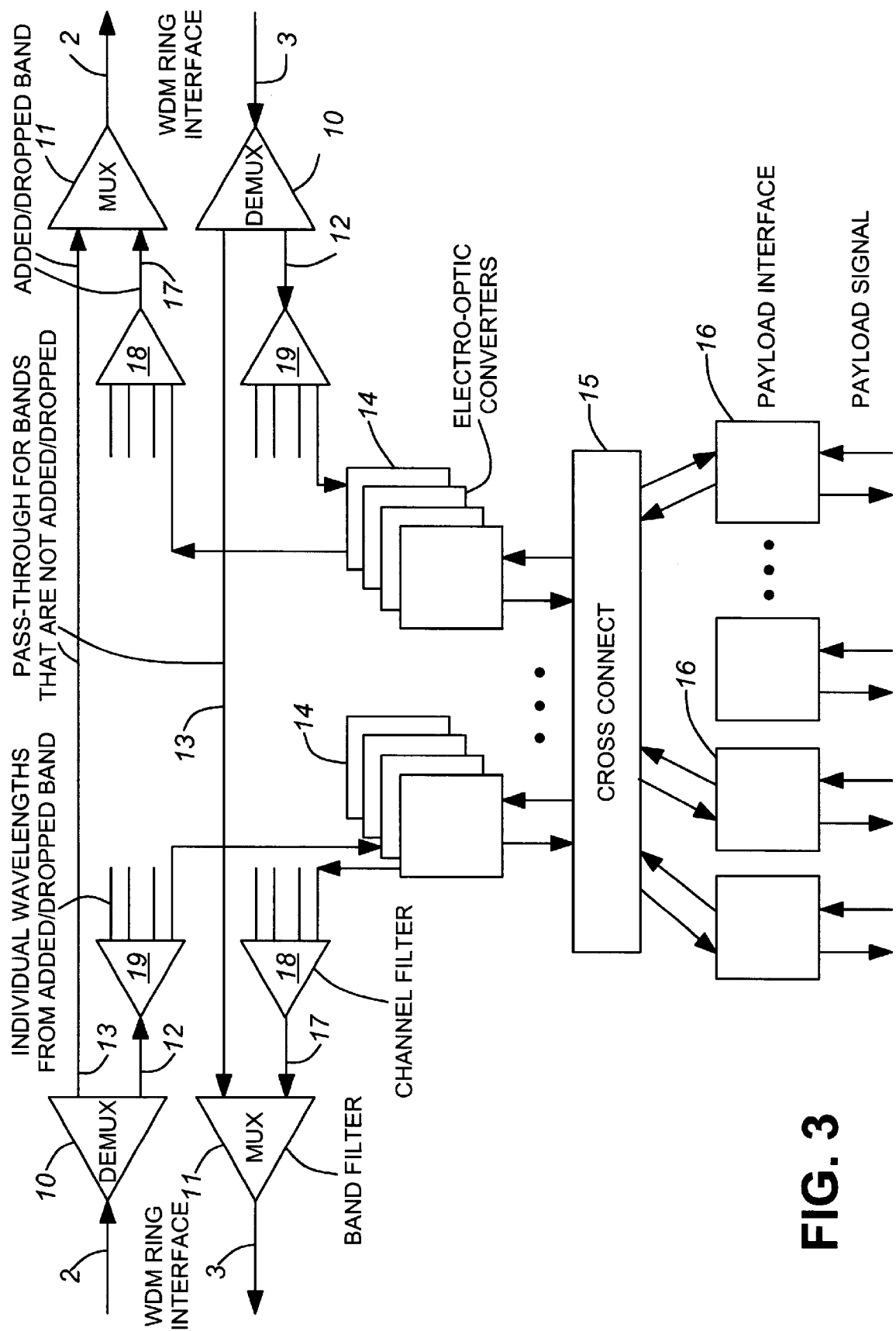
FIG. 3 is a block functional diagram of a network node.
Figure 4:
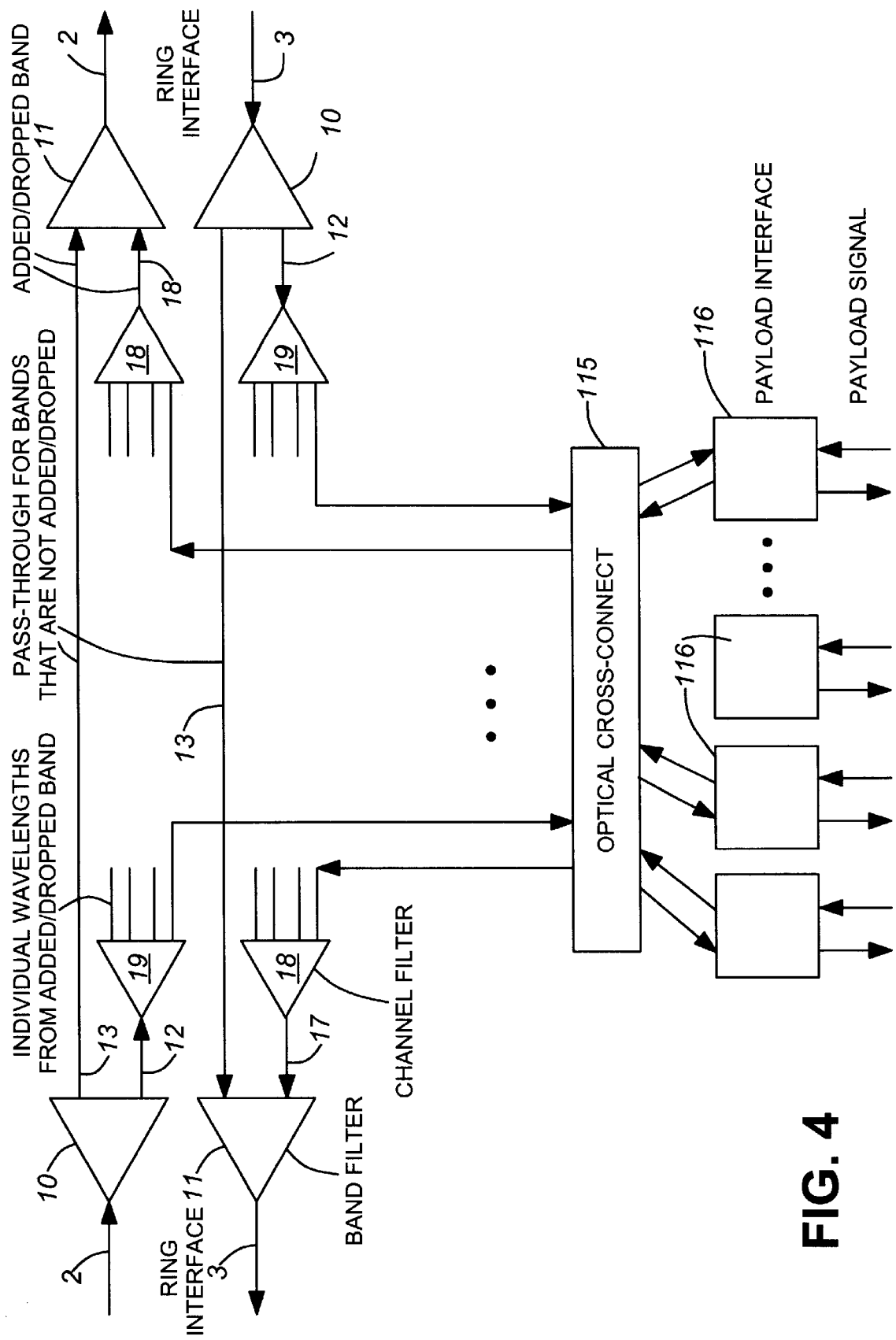
FIG. 4 is a block diagram network node with an optical cross connect switch.

FIG. 4 shows a similar arrangement to FIG. 3, except that the electro-optical converters have been omitted and the cross connect switch 115 is an optical switching device that performs optical switching and provides optical outputs to optical interfaces 116. With optical switching, wavelength conversion can be realized optically. Electro-absorption devices and/or semiconductor optical amplifiers (SOAs) may be used to perform the conversion.

Each node typically has at least one band filter, at least one laser diode, driver and MTCE (maintenance channel modulator), at least one PIN diode receiver, transimpedance amplifier, limit amplifier and MTCE demodulator, fine optical filters, a maintenance channel control processor, with Ethernet port and node control HW, and a per wavelength interface to subtending equipment or test data generator (option module). Optionally, a PLL data regenerator and cross-connect matrix can be provided. A low frequency bandpass filter picks off the maintenance channel data and it is demodulated by a PLL type FSK demodulator. The data stream then goes to the maintenance processor.

Each wavelength is driven by a DFB (Distributed Feedback) laser or Bragg grating reflector laser at a specific wavelength chosen to match the filter characteristics. The output power of the laser is in the range of −3 dbm to a possible high of +6 dbm. Laser components may require thermal stabilization (also providing a means of micro-tuning to specific wavelengths). The laser is driven by a single chip control circuit that combines the monitor diode and bias requirements of the device. Typically these devices have a PECL differential input.

Figure 5:
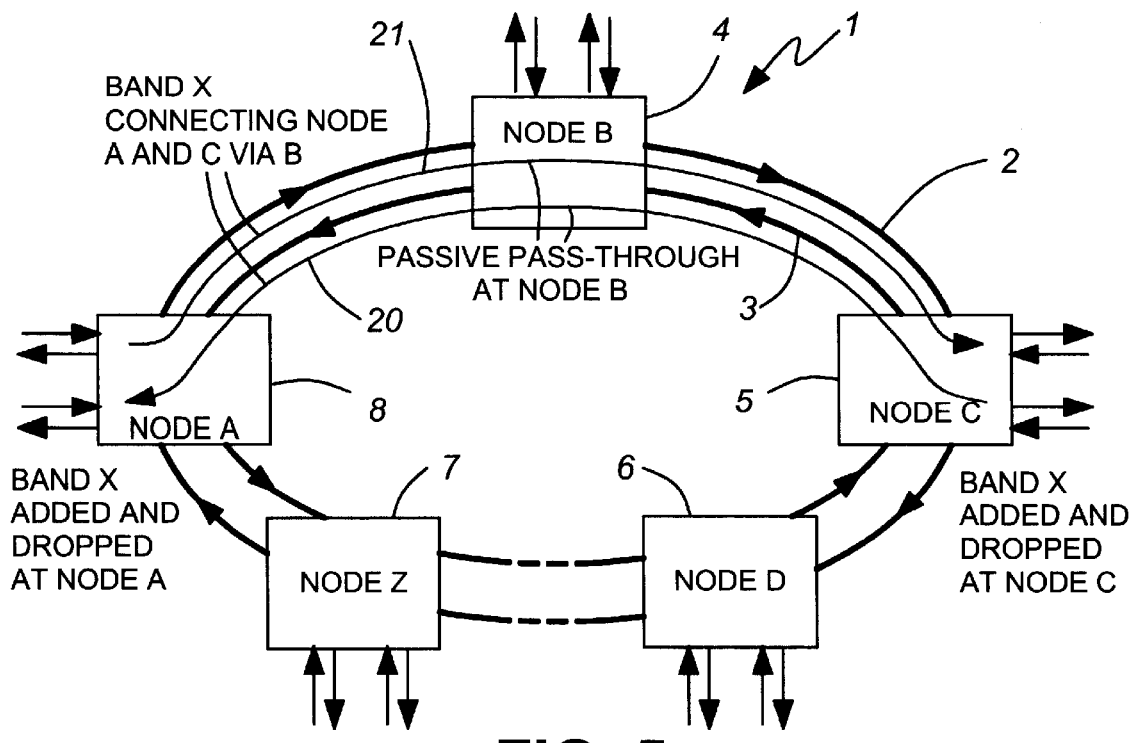
FIG. 5 illustrates a ring showing the waveband connections.

FIG. 5 shows one example of a connectivity diagram of a network operating in accordance with the invention. The nodes are physically interconnected in a ring by counter-rotating optic fiber rings as described with reference to FIG. 1. The bands of wavelengths provided direct WDM protocol independent connections between non adjacent rings. In FIG. 5, band X connects node 5 to node 8 in both directions. This means that node 5 and 8 add and drop band X., that is band X is passively reflected by the interference filter at node 4.

Figure 6:
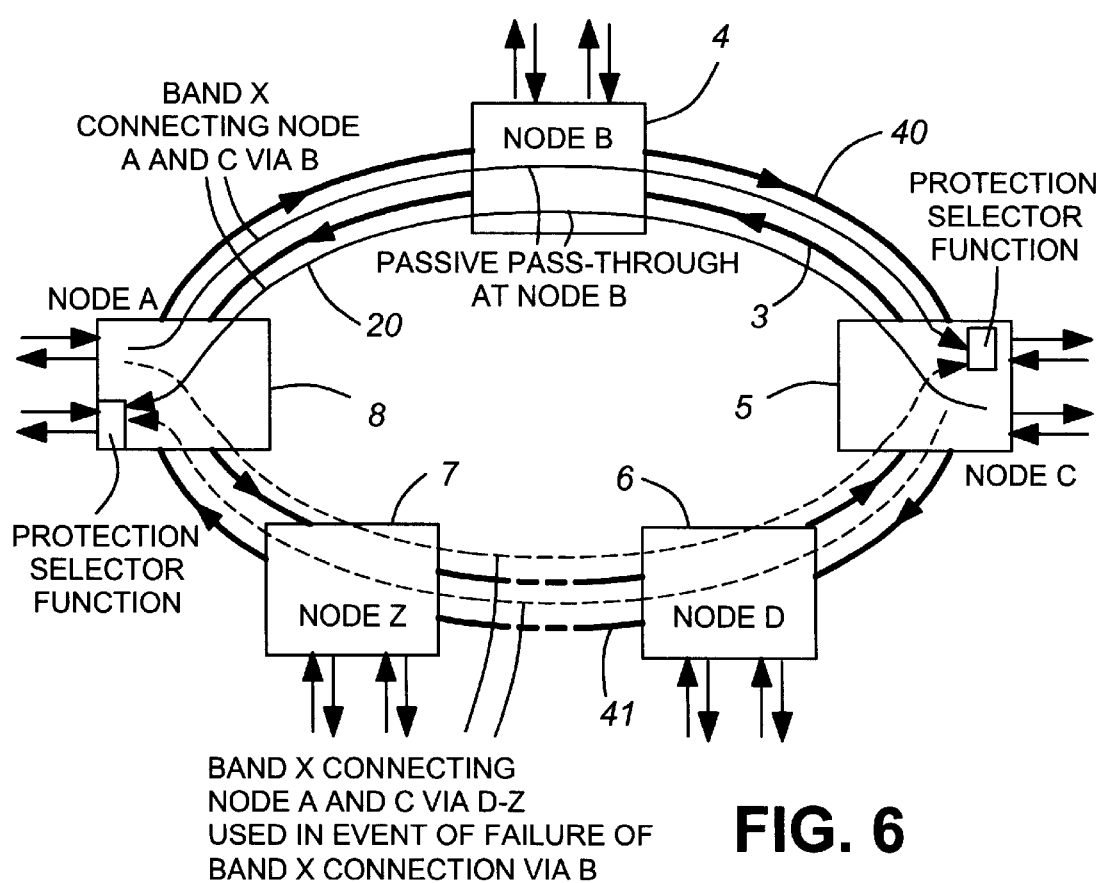
FIG. 6 illustrates a ring showing protection switching.

The invention also allows protection switching, with the bands acting as direct connections between the nodes. FIG. 6 is an example of protection switching.

In FIG. 6, a band connects X two nodes via two diverse paths on opposite arcs 40, 41 of the ring 1. One of these arcs can be used to provide a restoration path for all of the wavelengths in the band in the event of a failure of the other path. In FIG. 6, a band connects nodes A and C. The arc 40 via node B is used normally and the arc via nodes D–Z is spare. Node A and node C monitor the quality of the signals dropped from the band at each end of the connection. In the event of a failure of the connections via node B, nodes A and C re-establish the connections via nodes D–Z.

The drop nodes may use optical power measurements on each wavelength as a quality measure. If the optical power drops below a preset threshold, then a protection switch is triggered. This measurement is not dependent on the protocol or bit rate of the information carried on the wavelength.

Another quality measure that is protocol and bit-rate independent is a Bit Rate Consistency Monitor. The drop node counts the number of bits received over a given unit of time (long relative to the bit time of the lowest expected bit rate) and records the value of this count. If the value varies by more than some nominal amount, it is an indication that the channel is carrying noise and has therefore failed.

Figure 10:
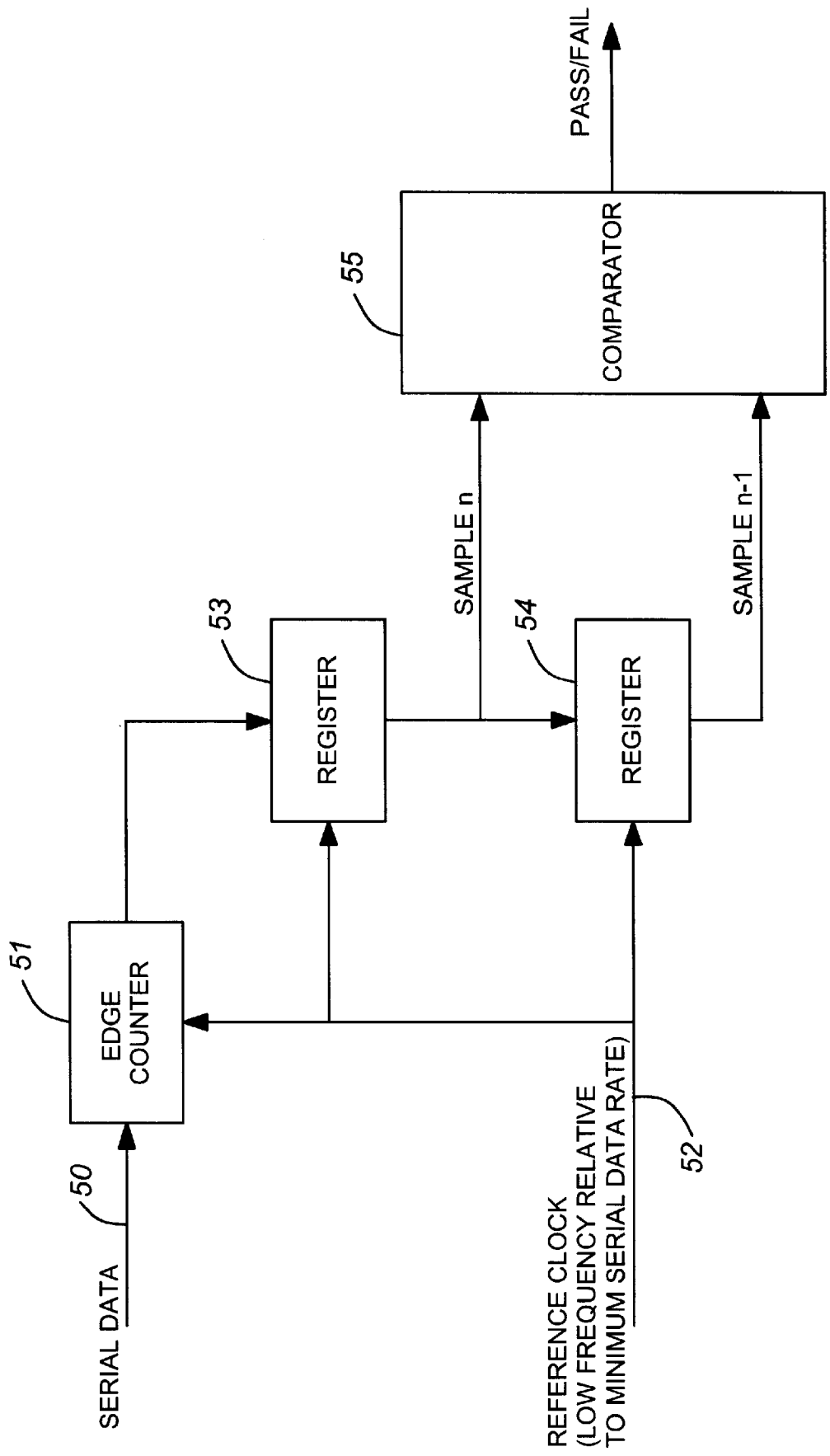
FIG. 10 shows a bit rate consistency monitor.

An example of a Bit Rate Consistency Monitor is shown in FIG. 10. Incoming serial data 50 is fed to edge counter 51, which inputs an M-bit count to register 53. A reference clock, which has a repetition rate low relative to the minimum serial data rate, is input to register 53 and 54 to latch the count samples n and n−1 and also to the counter to reset it between samples. Sample n from register 53 and sample n−1 from register 54 are compared in comparator 55 which generates a true/output depending on the consistency of the incoming bit rate.

In order to coordinate the switching of the traffic, the nodes at each end of the connection must communicate directly For example, in FIG. 6, if a failure of the connection is observed only at node C, then node C may have to communicate with node A to get the wavelengths that were being sent across the band via node B to be sent across the band via node D–Z. This can be accomplished using one or more of the maintenance channels that are carried on a pilot tone on each wavelength.

Figure 7:
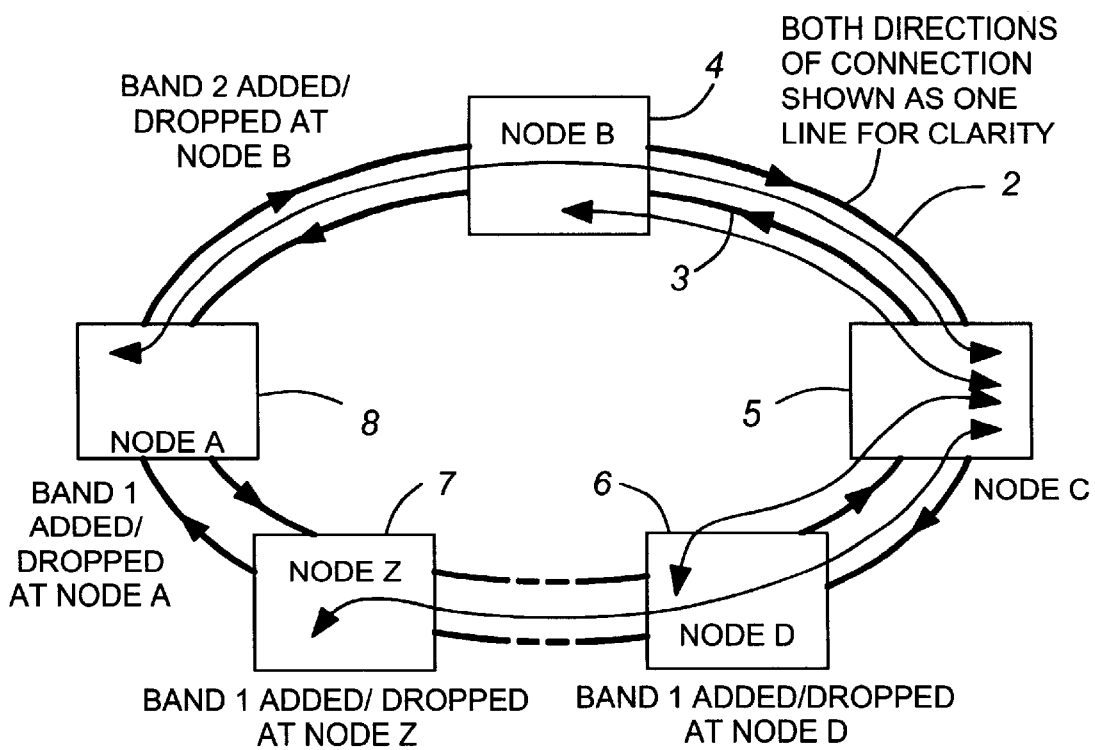
FIG. 7 is an example of a hubbed connection pattern.

FIG. 7 shows a hubbed connection pattern as a further example of the manner in which the nodes can be interconnected in accordance with the principles of the present invention. In FIG. 7, node C (5) acts as the hub from which "connections" are established to other nodes over dedicated wavebands extending between the hub node 5 and the remaining nodes.

Figure 8:
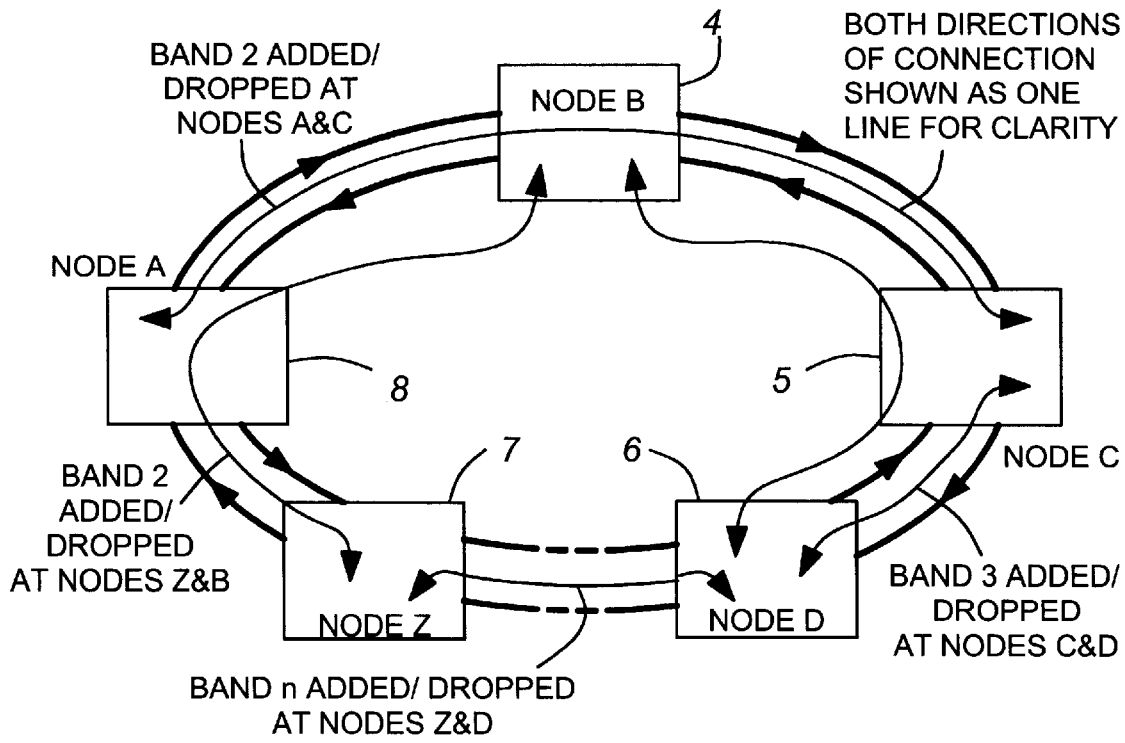
FIG. 8 is an example of a meshed connection pattern.

FIG. 8 shows a meshed arrangement, where the nodes are connected in the form of a mesh pattern. In all cases the wavebands act as bit pipes establishing protocol independent high speed connections directly between nodes, which may be non-adjacent.

Figure 9:
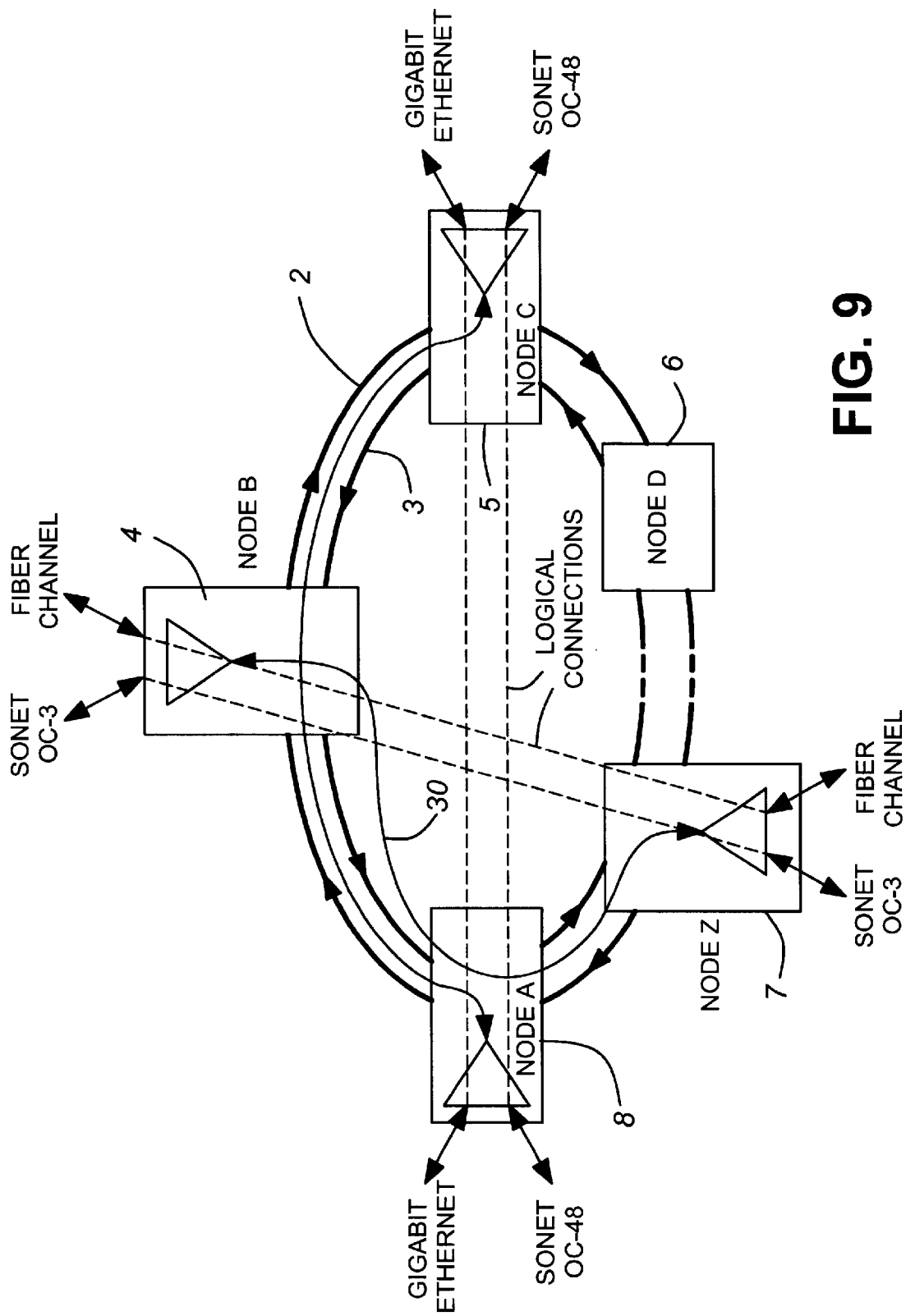
FIG. 9 illustrates a ring showing examples of payload signals.

FIG. 9 shows examples of a signal payload that may be carried by a ring operating in accordance with the invention. In FIG. 9, band 30 establishes a protocol independent connection between nodes 4 and 7. This connection can carry SONET OC-3 traffic and Fiber channel traffic directly between the nodes. The system architecture does not need to know anything about the protocols. The band 7 merely delivers a high speed bit stream at node 7, which can be resolved into SONET and Fiber channel streams at the far end node.

FIG. 9 also shows Gigabit Ethernet and SONET OC-48 traffic between sent between nodes 5 and 8. Again the ring is indifferent to the protocols involved. The data is merely transported as a high speed bit stream over the carrier wavelength without regard to the underlying protocol.

It is of course possible to cascade multiple rings, interconnecting them at common nodes. However, if many rings are cascaded, dispersion effects and jitter effects on the electrical/optical signals may accumulate. In order to compensate for this, a re-generation stage may need to be added to the cross-connect matrix at selected interconnect points. This re-generation device is a wide range PLL (phase-locked loop) that locks onto the incoming digital data stream, recovers a clock and uses the clock to re-generate the digital stream. It is not necessary for the re-generator to know the specific format of the data in the stream, only to be able to lock onto the digital transitions and clean up the edges with respect to dispersion and jitter.

If the PLL requires setting for lock range or center frequency, this can be accommodated by maintenance channel configuration messages that are directed to the hardware that needs to be controlled.

A variety of external data sources can be connected to the data path for each wavelength. This can include OC-3, OC-12, a proprietary interface such as Newbridge ISL (Inter Shelf Links) and possibly Gigabit Ethernet sources.

As mentioned above, the wavelengths carry a maintenance channel, which is driven by an FSK modulator originating directly from the maintenance channel data stream.

In a multi-node WDM ring network the opportunity exists for overall optimization economies that can be facilitated by the individual nodes being able to communicate with each other to exchange information that is used to control the laser device by adjusting the fundamental operating parameters of the device and other optical elements that may be used in such a network. Methods of local optimization of laser parameters have been discussed in the literature. However, this approach uses and end-to-end approach which is more complete in terms of being able to adjust for network operating parameters. It also allows consideration to be given for specification tolerance reduction of other network elements e.g. filter roll off. centre frequency position and gain elements that may be present in such a ring configuration.

For each wavelength operating between two points in the WDM ring, there is a laser source, an add filter (or portion of an add/drop filter), fibre transmission media a drop filter (or portion of an add/drop filter), an optical detector and ancillary receive electronics to route the signal to other portions of the system.

The laser source is controlled by setting a laser current threshold, modulation current level and operating temperature. The operating wavelength is adjusted (by temp control) so as to provide maximum signal energy to the detector at the far end. This procedure aligns the emitted wavelength with the combined cascade filter response so as to minimizes the losses due to individual component tolerances. It also has the benefit of any medium to long term wavelength variation of the laser from the system loss plan calculations.

The peak optical power and the extinction ratio (ER) is regulated and controlled by special electronic circuits or by an embedded microcontroller. Laser slope efficiencies at bias level and at peak level can be measured by varying bias current and peak current in very small steps respectively. Such measurement allows the laser ER and peak power to be frequently monitored and controlled.

Wavelength stability is attained by adjusting the laser operating wavelength (e.g. adjusting laser operating temperature) while monitoring the received power level at the receiving node. Since the WDM filter modules have a narrow pass band (approximately 1 nm) for each wavelength channel and possesses other optical characteristics, it is possible to precisely re-align the laser operating wavelength on a regular basis.

In certain circumstances when operating the same wavelength on two different segments of the ring it may be necessary to set the operating wavelengths at slightly different points so as to minimize 'beat noise'(a coherent interference effect between optical sources). This noise factor is overcome by having the operating wavelengths separated by come small amount (0.05 nm to 0.2 nm).

The other parameters of laser operation (threshold) and modulation depth are controlled end-to-end in such a way as to optimize the receive eye signal for a given data rate. The maintenance signal that is superimposed on the optical wavelength gives a means of measuring the error performance of the mtce channel (which is directly proportional to the error rate of the main data channel on the optical beam.). By means of message feedback, the received signal condition state can be sent back to the laser transmitter so that corrective actions or stabilization routines can be run. The specific control routines are software algorithms that run on the embedded processor that is associated with the laser control circuitry. These control algorithms will include both wavelength stabilization routines and received eye signal optimization.

In a network of WDM laser sources and receivers (including drop/add filters) it may be necessary to add amplification to individual wavelengths or groups of wavelengths so as to obtain sufficient optical energy to achieve a desired bit error rate at the receiver. In a known topology situation a number of EDFA elements could be added to the system to overcome transmission losses due to fibre and filter loss. Due to the topology of the ring and the fact that it is a ring configuration, fixed gain blocks such as EDFA's may be difficult to specify and may in fact impair the performance of some wavelengths in the system.

A solution to the problem exists in the form of a SOA element combined with an electrically programmable attenuator element. This technology can be obtained in discrete element form or integrated onto a silicon waveguide structure. The SOA provides the pure gain required. the programmable attenuator allows for signal level optimization on a node to node basis, independent of the levels required for any other node to node level on the ring. The SOA/Attenuator combination may be applied at the laser source (as a post-amplifier), the receiver (as a pre-amplifier) or both.

In the event that it was desired to use EDFA elements as the gain block in a fibre based ring system, the programmable attenuator could be used to optimize the receive signal level at the receiver. It is felt that this would not provide as flexible a solution as the SOA/attenuator system but would overcome the problem of individual channels gain adjustment that is required in such an amplified add/drop system.

In all cases the key to the system optimization is the ability for the system to communicate on the mtce channels between source/receiver pairs and to optimize via control algorithms the operating level of the signal in such a way as to obtain the best end-to-end performance and WDM network management.

The maintenance and control processor of each node is a small computer board that contains processor, ram, flash memory for program and application store and several serial interfaces (one per MTCE link). The processor has an embedded DOS that is augmented with a TCP/IP routing and control module (Flexcom router and control switch). Since the Flexcom product is actually a multi-tasking O/S operating in conjunction with the embedded DOS, several monitor and control functions specific to laser operation and maintenance are integrated into this SW. A status and reporting function is also incorporated.

By means of this switch, all nodes in a system may be controlled and monitored by a remote PC that operates a Telnet session to each processor. Maintenance traffic may also be routed through a maintenance processor to other nodes or subtending equipment.

Figure 11:
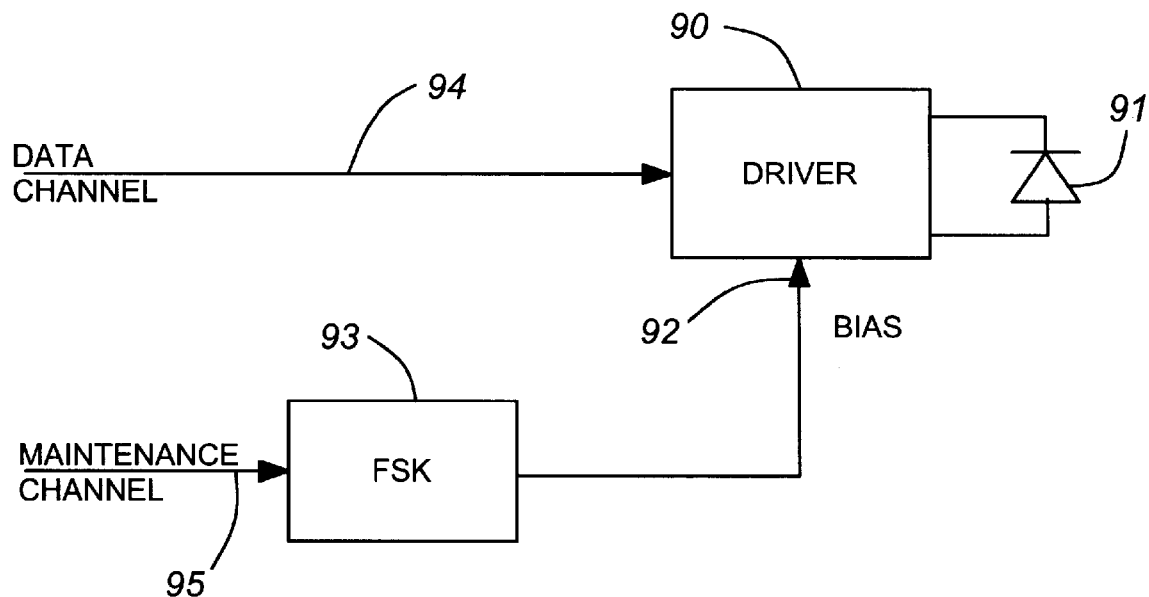
FIG. 11 is a block diagram of a maintenance channel signal driver.

FIG. 11 shows the arrangement for creating the maintenance channel. Driver 90 for laser 91 has a bias input 92 that is modulated by FSK modulator 93 receiving at its input the maintenance channel 95. The data channel, which is all digital, is applied to the main input of the driver 90.

Figure 12:
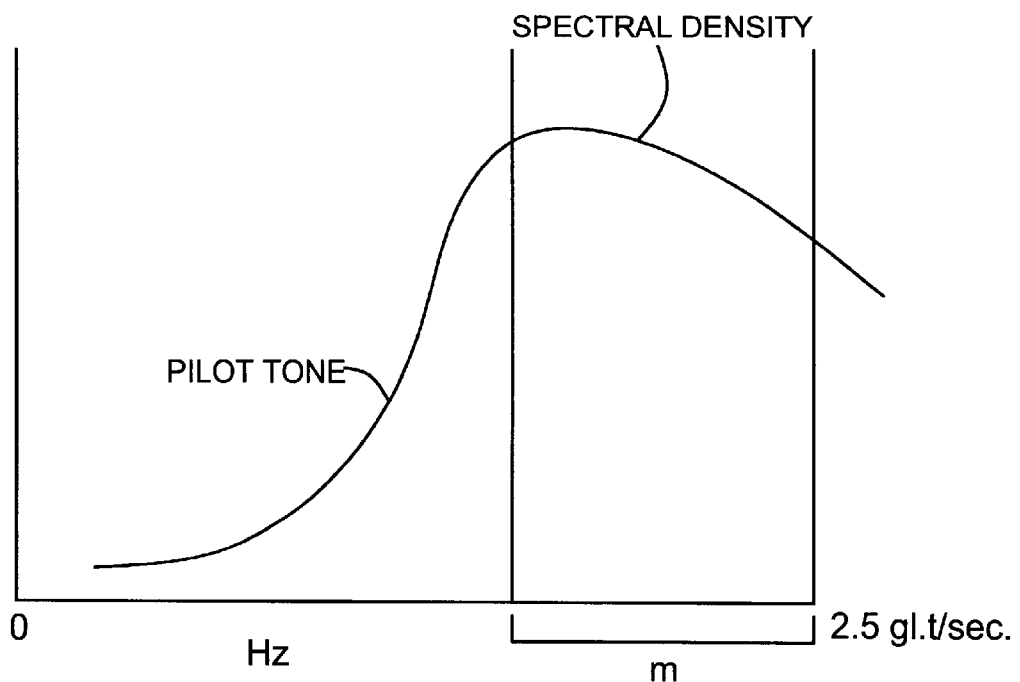
FIG. 12 is a graph showing the spectral density of each wavelength.

The arrangement shown in FIG. 11 embeds a pilot tone on each wavelength, which may be of low bit rate (<256 kbps). This pilot tone is injected into the wavelength channel by modulation of the bias current by the FSK modulator 93 that modulates the MTCE channel data stream into a sequence of tones. Other carrier modulation systems such as QAM-64 or QAM-256 or OFDM may be used. The level of the pilot tone is approximately 20 dB below the main data path. The effect of the pilot tone on the BER of the main data channel, which is purely digital, is minimal since it is carried on a portion of the spectral distribution curve well outside the portion carrying the high bit rate data (see FIG. 12).

The MTCE channel modulation ensures wavelength integrity between nodes, provides a power level estimate of wavelength link, provides node status and monitoring (SNMP, RMON type messaging), distribution of network level timing synchronization, and SW & FW downloads for node processors and sub-tended equipment.

Since the MTCE channel is modulated independently from the regular 'data pipe' channel, the MTCE does not need to know what the format of data in the main channel is. This is extremely important in allowing format independence of end user applications and access.

Figure 13:
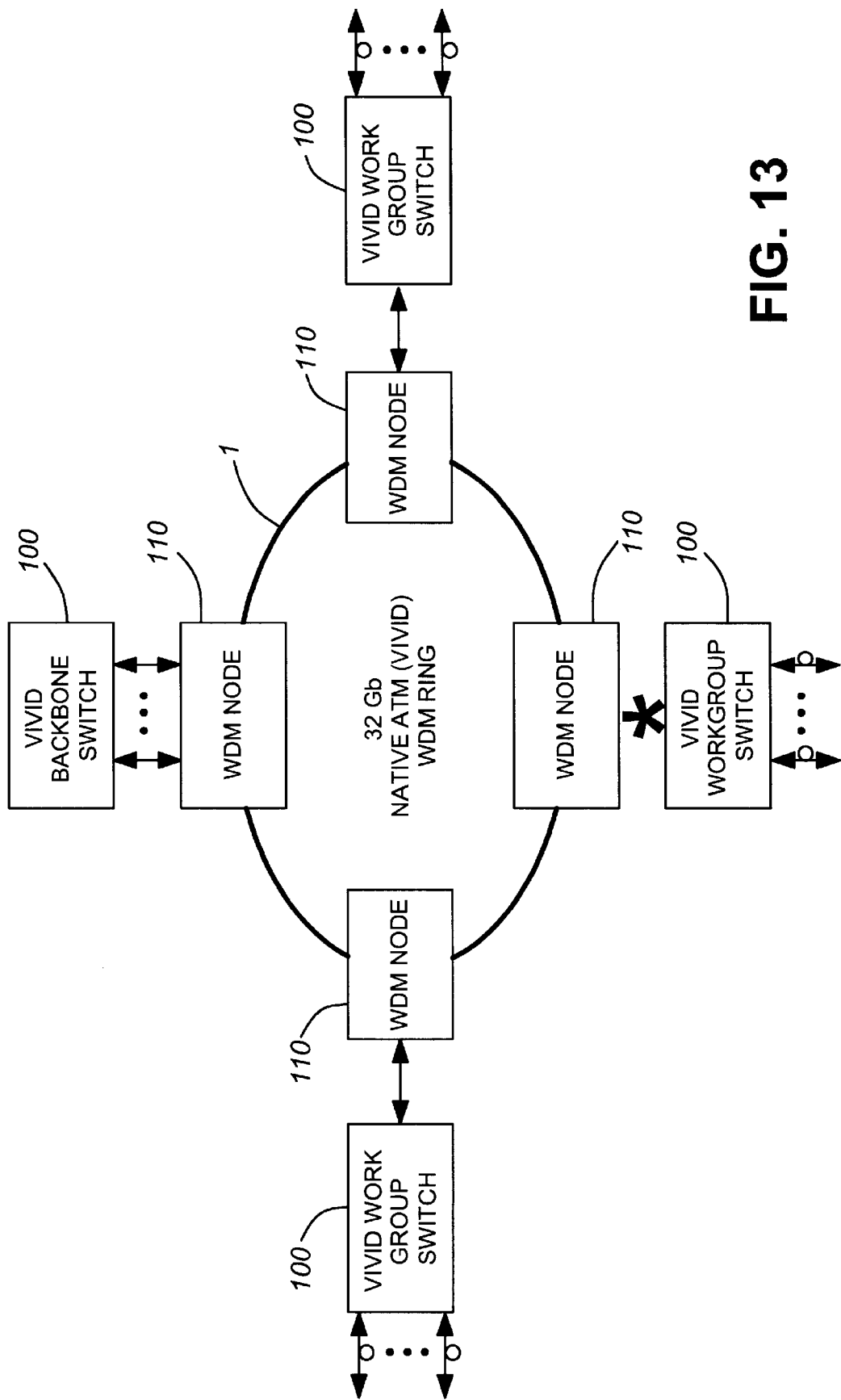
FIG. 13 is a block diagram of a distributed ATM switch.

The described arrangement provides a network capable of carrying data in the terabit/sec range over distances of up to 30 km, and more when cascaded rings are provided. It also allows the components of high speed switches, such as ATM switches, to be distributed over a campus wide network, resulting in substantial savings in trunk cards and processors. FIG. 13 is an example of such a distributed switch. Switch components 100 are interconnected over ring 1 using nodes 110 interconnected in the manner described above.

We claim:

1. A fiber optic wavelength division multiplexed ring, comprising:
   a plurality of switching nodes,
   means for generating a plurality of wavelengths organized into bands on said ring, and transmitting a like plurality of traffic channels associated with said wavelengths; and
   means for transmitting maintenance channel data on at least one of said wavelengths as a pilot tone;
   wherein said maintenance channel has a modulation depth such that it matches the bit error rate (BER) or waterfall curve performance of the data channel so that the system can determine the performance of the data channel by monitoring the maintenance channel data and without looking at the maintenance channel payload.

2. A network as claimed in claim 1, wherein said maintenance channel carriers feedback information about the performance of said means for generating at said destination node.

3. A network as claimed in claim 2, wherein said feedback information is used to control operation of said means for generating.

4. A network as claimed in claim 3, wherein said means for generating includes a laser emitting at said respective wavelength and said feedback information is used to control the laser extinction rate and peak power.

5. A network as claimed in claim 2, wherein said feedback information is used to initiate corrective action routines for said generating means.

6. A network as claimed in claim 2, wherein said feedback information is used to initiate stabilization routines for said generating means.

7. A network as claimed in claim 2, wherein said feedback information is used to control operation of said destination switching node.

8. A network as claimed in claim 1, wherein said maintenance channel carries at least one of switching information, maintenance information and feedback information.

9. A network as claimed in claim 8, wherein said switching information, maintenance information and feedback information are independent from the bit rate of the respective traffic channel.

10. A network as claimed in claim 8, wherein said switching information, maintenance information and feedback information are independent from the protocol of the respective traffic channel.

11. A fiber optic wavelength division multiplexed ring comprising:
- a plurality of switching nodes,
- means for generating a plurality of wavelengths organized into bands on said ring, and transmitting a like plurality of traffic channels associated with said wavelengths; and
- means for transmitting maintenance channel data on at least one of said wavelengths as a pilot tone;
- wherein said maintenance channel has a modulation depth, such that the system can determine the performance of the respective traffic channel by monitoring the bit error rate (BER) or waterfall curve performance of the maintenance channel data and without looking at the maintenance data.

12. A fiber optic wavelength division multiplexed ring comprising:
- a plurality of switching nodes,
- means for generating a plurality of wavelengths organized into bands on said ring, and transmitting a like plurality of traffic channels associated with said wavelengths; and
- means for transmitting maintenance channel data on at least one of said wavelengths as a pilot tone;
- wherein said maintenance channel has a known modulation depth with respect to said respective traffic channel, such that the system can determine the performance of the respective traffic channel by monitoring the bit error rate (BER) or waterfall curve performance of the maintenance channel data and without looking at the maintenance data.

* * * * *